United States Patent
Guérin et al.

(10) Patent No.: US 11,363,214 B2
(45) Date of Patent: Jun. 14, 2022

(54) LOCAL EXPOSURE COMPENSATION

(71) Applicant: GoPro, Inc., San Mateo, CA (US)

(72) Inventors: Guillaume Matthieu Guérin, Chatillon (FR); Michel Auger, Paris (FR); Karl Krissian, Fontenay-aux-Roses (FR)

(73) Assignee: GoPro, Inc., San Mateo, CA (US)

( * ) Notice: Subject to any disclaimer, the term of this patent is extended or adjusted under 35 U.S.C. 154(b) by 120 days.

(21) Appl. No.: 16/756,725

(22) PCT Filed: Oct. 17, 2018

(86) PCT No.: PCT/US2018/056226
§ 371 (c)(1),
(2) Date: Apr. 16, 2020

(87) PCT Pub. No.: WO2019/079403
PCT Pub. Date: Apr. 25, 2019

(65) Prior Publication Data
US 2020/0244895 A1    Jul. 30, 2020

Related U.S. Application Data

(60) Provisional application No. 62/589,073, filed on Nov. 21, 2017, provisional application No. 62/573,808, filed on Oct. 18, 2017.

(51) Int. Cl.
*H04N 5/243* (2006.01)
*G06T 3/40* (2006.01)
(Continued)

(52) U.S. Cl.
CPC .......... *H04N 5/243* (2013.01); *G06T 3/4038* (2013.01); *G06T 5/008* (2013.01); *G06T 5/009* (2013.01);
(Continued)

(58) Field of Classification Search
CPC ... H04N 5/23238; H04N 5/243; H04N 5/2622
See application file for complete search history.

(56) References Cited

U.S. PATENT DOCUMENTS 6,571,022 B2 *  5/2003  Okisu ................... G06T 3/4038
                                                    382/294
6,813,391 B1 *  11/2004 Uyttendaele ............. G06K 9/03
                                                    345/629
(Continued)

FOREIGN PATENT DOCUMENTS

KR      100791397 B1 *  1/2008
WO      2009123705      10/2009
(Continued)

OTHER PUBLICATIONS

International Preliminary Report on Patentability for App No. PCT/US2018/056226, dated Apr. 30, 2020, 8 pages.
(Continued)

*Primary Examiner* — John Villecco
(74) *Attorney, Agent, or Firm* — Young Basile Hanlon & MacFarlane, P.C.

(57) ABSTRACT

Image signal processing includes generating an exposure compensated image based on a gain value applied to an exposure level of a first image and a gain value applied to an exposure level of a second image. The gain value may be progressively increased from an approximate center of the first image to an edge of the first image to a common exposure level. The gain value may be progressively decreased from an approximate center of the second image to an edge of the second image to the common exposure level. Gain values may be scaled on each color channel for a pixel based on a saturation level of the pixel.

20 Claims, 14 Drawing Sheets

(51) Int. Cl.
*G06T 5/00* (2006.01)
*G06T 5/50* (2006.01)
*G06T 7/00* (2017.01)
*H04N 5/235* (2006.01)
*H04N 5/232* (2006.01)

(52) U.S. Cl.
CPC .............. *G06T 5/50* (2013.01); *G06T 7/0002* (2013.01); *H04N 5/2351* (2013.01); *H04N 5/2355* (2013.01); *H04N 5/23238* (2013.01); *G06T 2207/20216* (2013.01)

(56) References Cited

U.S. PATENT DOCUMENTS

| | | | | |
|---|---|---|---|---|
| 7,102,637 | B2 * | 9/2006 | Chen | H04N 13/133 |
| | | | | 345/426 |
| 7,260,258 | B2 * | 8/2007 | Foote | H04N 5/23238 |
| | | | | 382/167 |
| 9,756,243 | B2 * | 9/2017 | Shohara | H04N 5/2258 |
| 9,832,378 | B2 * | 11/2017 | Doepke | H04N 5/23238 |
| 9,838,614 | B1 * | 12/2017 | Brailovskiy | H04N 5/265 |
| 10,009,551 | B1 * | 6/2018 | Adcock | H04N 5/265 |
| 10,136,055 | B2 * | 11/2018 | Lei | G06T 3/0018 |
| 10,165,194 | B1 * | 12/2018 | Baldwin | H04N 9/04555 |
| 10,166,921 | B2 * | 1/2019 | Sypitkowski | G06K 9/4652 |
| 10,244,164 | B1 * | 3/2019 | Banerjee | G06T 7/292 |
| 10,462,384 | B2 * | 10/2019 | Abbas | H04N 7/181 |
| 10,477,106 | B2 * | 11/2019 | Nomura | G02B 13/06 |
| 10,498,958 | B2 * | 12/2019 | Meier | G06T 11/60 |
| 10,602,079 | B2 * | 3/2020 | Pincenti | G06T 5/20 |
| 10,609,302 | B2 * | 3/2020 | Kazama | H04N 5/23296 |
| 10,614,553 | B1 * | 4/2020 | Wang | G06T 7/33 |
| 10,614,603 | B2 * | 4/2020 | Sahu | H04N 9/69 |
| 10,616,442 | B2 * | 4/2020 | Takizawa | H04N 1/3878 |
| 10,621,767 | B2 * | 4/2020 | Forutanpour | G06T 3/0037 |
| 10,645,358 | B2 * | 5/2020 | Guerin | H04N 5/2258 |
| 10,652,523 | B2 * | 5/2020 | Henningsson | G06T 7/0002 |
| 10,666,862 | B2 * | 5/2020 | Thurow | H04N 5/2622 |
| 10,685,467 | B2 * | 6/2020 | Choi | H04N 13/204 |
| 10,694,102 | B2 * | 6/2020 | Roulet | H04N 5/23238 |
| 10,778,910 | B2 * | 9/2020 | Kottel | H04N 13/243 |
| 10,943,340 | B2 * | 3/2021 | Hutchinson | G06T 3/4007 |
| 10,958,834 | B2 * | 3/2021 | Roulet | G06T 5/002 |
| 10,972,661 | B2 * | 4/2021 | Meier | G06T 3/0068 |
| 10,992,881 | B2 * | 4/2021 | Abbas | H04N 7/181 |
| 11,057,573 | B2 * | 7/2021 | Dabral | G06T 7/90 |
| 2006/0115182 | A1 * | 6/2006 | Deng | G06T 5/009 |
| | | | | 382/284 |
| 2013/0208140 | A1 * | 8/2013 | Quast | H04N 5/23203 |
| | | | | 348/229.1 |
| 2013/0321671 | A1 * | 12/2013 | Cote | H04N 5/365 |
| | | | | 348/241 |
| 2014/0078247 | A1 * | 3/2014 | Shohara | H04N 9/735 |
| | | | | 348/38 |
| 2016/0366386 | A1 * | 12/2016 | Douady-Pleven | H04N 5/213 |
| 2017/0094169 | A1 * | 3/2017 | Yoshikawa | G06T 5/006 |
| 2018/0035047 | A1 * | 2/2018 | Lei | G02B 13/06 |
| 2018/0075635 | A1 * | 3/2018 | Choi | H04N 13/106 |
| 2018/0191956 | A1 * | 7/2018 | Nomura | G03B 7/091 |
| 2019/0068890 | A1 * | 2/2019 | Kazama | H04N 5/23296 |
| 2019/0260978 | A1 * | 8/2019 | Guerin | H04N 5/23216 |
| 2019/0289223 | A1 * | 9/2019 | Abbas | H04N 5/265 |
| 2019/0325580 | A1 * | 10/2019 | Lukac | G06T 7/12 |
| 2019/0340737 | A1 * | 11/2019 | Kawaguchi | H04N 5/217 |
| 2020/0195858 | A1 * | 6/2020 | Kazama | H04N 5/243 |
| 2020/0358944 | A1 * | 11/2020 | Douady | H04N 5/2352 |
| 2020/0389636 | A1 * | 12/2020 | Guerin | H04N 9/045 |
| 2021/0281772 | A1 * | 9/2021 | Dabral | H04N 5/2258 |
| 2021/0289118 | A1 * | 9/2021 | Guérin et al. | H04N 5/2353 |
| 2021/0400193 | A1 * | 12/2021 | Ma | G06T 3/0018 |

FOREIGN PATENT DOCUMENTS

| | | |
|---|---|---|
| WO | 2014042104 A1 | 3/2014 |
| WO | 2016200480 | 12/2016 |

OTHER PUBLICATIONS

PCT International Search Report and Written Opinion for PCT/US2018/056226, dated Dec. 12, 2018, 11 pages.

* cited by examiner

LOCAL EXPOSURE COMPENSATION

CROSS-REFERENCE TO RELATED APPLICATION(S)

This application is a 371 of International Application No. PCT/US2018/056226 filed on Oct. 17, 2018, which claims the priority to U.S. Provisional Application No. 62/589,073, filed on Nov. 21, 2017, and U.S. Provisional Patent Application No. 62/573,808, filed on Oct. 18, 2017, the entire disclosures of which are hereby incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to digital image and video processing, including temporal and spatial image noise reduction, local motion compensation, local exposure compensation, spatially combining images, image distortion compensation, bitrate allocation, image alignment, prevention of highlight clipping, and reduction in lens flare.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure satisfies the foregoing needs by providing, inter alia, apparatus and methods for image signal processing based local exposure compensation. Image signal processing may include generating an exposure compensated image based on a gain value applied to the exposure level of the first image and a gain value applied to the exposure level of the second image. The gain value may progressively increase from an approximate center of the first image to the edge of the first image to a common exposure level, and the gain value may be progressively decreased from an approximate center of the second image to the edge of the second image to the common exposure level. Gain values may be scaled on each color channel for a pixel based on a saturation level of the pixel.

The common exposure level may be determined by averaging the exposure level of the first image and the exposure level of the second image. In addition, the common exposure level may be obtained by applying a global gain of greater than or equal to one (1) to the first image, by applying a spatially variable gain of greater than or equal to one (1) to the first image, by applying a global gain of greater than or equal to one (1) and a spatially variable gain of greater than or equal to one (1) to the first image. Similarly, the common exposure level may be obtained by applying a global gain of less than or equal to one (1) to the second image, by applying a spatially variable gain of less than or equal to one (1) to the second image, or by applying a global gain of less than or equal to one (1) and a spatially variable gain of less than or equal to one (1) to the second image.

An aspect of the disclosure relates to a non-transitory computer-readable storage medium, comprising executable instructions that, when executed by a processor, facilitate performance of operations including obtaining, by an image signal processor, from a first image sensor, a first image signal associated with a first image comprising first pixels and obtaining, from a second image sensor, a second image signal associated with a second image comprising second pixels. The operations may include joining, by the image signal processor, an edge of the first image to an edge of the second image forming a stitch point between the edge of the first image and the edge of the second image and determining an exposure level for each of the first image and the second image, wherein the exposure level of the first image is lower than the exposure level of the second image. The operations may also include applying a gain value of greater than or equal to one (1) to the exposure level of the first image, applying a gain value of less than or equal to one (1) to the exposure level of the second image, and generating an exposure compensated image based on the gain value applied to the exposure level of the first image and the gain value applied to the exposure level of the second image. In some examples, the gain value may be adjusted in only one image, for example either the first image or the second image.

The non-transitory computer-readable storage medium may further facilitate performance of operations including determining a saturation level of each pixel in the second pixels of the second image, and applying a gain value of less than or equal to one (1) to the pixel if the saturation level of the pixel of the second pixels is below a threshold. The threshold may be a saturation level threshold and may be two times the saturation level minus a maximum saturation level. In addition, the non-transitory computer-readable storage medium may further facilitate performance of operations including scaling, by the image signal processor, the gain value of each pixel of the second pixels that is below the threshold. The gain value may be scaled for each of color channel red (R), color channel green (G), and color channel blue (B).

The non-transitory computer readable storage medium may further facilitate performance of operations including determining, by the image signal processor, a common exposure level, and progressively increasing the gain value of greater than or equal to one (1) from an approximate center of the first image to the edge of the first image to the common exposure level at the stitch point and progressively decreasing the gain value of less than or equal to one (1) from an approximate center of the second image to the edge of the second image to the common exposure level at the stitch point. The common exposure level may be determined by averaging the exposure level of the first image and the exposure level of the second image. The common exposure level is not limited to the average exposure level of the first image and the exposure level of the second image and may be any exposure level between the exposure level of the first image and the exposure level of the second image.

Another aspect of the disclosure is a method for digital image and video processing. The method may include obtaining, by an image signal processor, from a first image sensor, a first image signal associated with a first image comprising first pixels and obtaining, from a second image sensor, a second image signal associated with a second image comprising second pixels. The method may include joining, by the image signal processor, an edge of the first image to an edge of the second image forming a stitch point between the edge of the first image and the edge of the second image and determining an exposure level for each of the first image and the second image, wherein the exposure level of the first image is lower than the exposure level of the second image. The method may also include applying a gain value of greater than or equal to one (1) to the exposure level of the first image, applying a gain value of less than or equal to one (1) to the exposure level of the second image, and generating an exposure compensated image based on the gain value applied to the exposure level of the first image and the gain value applied to the exposure level of the second image. In some examples, the gain value may be adjusted in only one image, for example either the first image or the second image.

The method may further include determining a saturation level of each pixel in the second pixels of the second image, and applying a gain value of less than or equal to one (1) to the pixel if the saturation level of the pixel of the second pixels is below a threshold. The threshold may be a saturation level threshold and may be two times the saturation level minus a maximum saturation level. In addition, the method may further include scaling, by the image signal processor, the gain value of each pixel of the second pixels that is below the threshold. The gain value may be scaled for each of color channel R, color channel G, and color channel B.

The method may further include determining, by the image signal processor, a common exposure level, and progressively increasing the gain value of greater than or equal to one (1) from an approximate center of the first image to the edge of the first image to the common exposure level at the stitch point and progressively decreasing the gain value of less than or equal to one (1) from an approximate center of the second image to the edge of the second image to the common exposure level at the stitch point. The common exposure level may be determined by averaging the exposure level of the first image and the exposure level of the second image. The common exposure level is not limited to the average exposure level of the first image and the exposure level of the second image and may be any exposure level between the exposure level of the first image and the exposure level of the second image.

Another aspect of the disclosure is an apparatus. The apparatus may include a first image sensor, a second image sensor, and an image signal processor. The image signal processor may be configured to obtain, from the first image sensor, a first image signal associated with a first image comprising first pixels and obtain, from the second image sensor, a second image signal associated with a second image comprising second pixels. The image signal processor may be configured to join an edge of the first image to an edge of the second image to form a stitch point between the edge of the first image and the edge of the second image and determine an exposure level for each of the first image and the second image, wherein the exposure level of the first image is lower than the exposure level of the second image. The image signal processor may also be configured to apply a gain value of greater than or equal to one (1) to the exposure level of the first image, apply a gain value of less than or equal to one (1) to the exposure level of the second image, and generate an exposure compensated image based on the gain value applied to the exposure level of the first image and the gain value applied to the exposure level of the second image. In some examples, the gain value may be adjusted in only one image, for example either the first image or the second image.

The image signal processor may be further configured to determine a saturation level of each pixel in the second pixels of the second image, and apply a gain value of less than or equal to one (1) to the pixel if the saturation level of the pixel of the second pixels is below a threshold. The threshold may be a saturation level threshold and may be two times the saturation level minus a maximum saturation level. In addition, the image signal processor may be further configured to scale the gain value of each pixel of the second pixels that is below the threshold. The gain value may be scaled for each of color channel R, color channel G, and color channel B.

The image signal processor may be further configured to determine a common exposure level, and progressively increase the gain value of greater than or equal to one (1) from an approximate center of the first image to the edge of the first image to the common exposure level at the stitch point and progressively decrease the gain value of less than or equal to one (1) from an approximate center of the second image to the edge of the second image to the common exposure level at the stitch point. The common exposure level may be determined by averaging the exposure level of the first image and the exposure level of the second image. The common exposure level is not limited to the average exposure level of the first image and the exposure level of the second image and may be any exposure level between the exposure level of the first image and the exposure level of the second image.

Another aspect of this disclosure includes a method. The method may include stitching an edge of a first image to an edge of a second image. In an example, an exposure level of the first image may be less than an exposure level of the second image. The method may include applying a gain value greater than one (1) to the first image. The method may include determining a saturation level of each pixel in the second image. In an example, each pixel in the second image may be determined as a saturated pixel or a non-saturated pixel. The method may include applying a gain value less than one (1) to each non-saturated pixel in the second image. The method may include obtaining an exposure compensated image. The exposure compensated image may be based on the gain value applied to the exposure level of the first image, the gain value applied to the exposure level of each non-saturated pixel of the second image, or both.

Another aspect of this disclosure includes a method. The method may include stitching an edge of a first image circle to an edge of a second image circle. In an example, an exposure level of the first image circle may be less than an exposure level of the second image circle. The method may include applying a gain value greater than one (1) to the first image circle. In an example, the gain value of the first image circle may be gradually increased from a center point of the first image circle towards the edge of the second image circle. The method may include applying a gain value less than one (1) to the second image circle. In an example, the gain value of the second image circle may be gradually decreased from a center point of the second image circle towards the edge of the first image circle. The method may include obtaining an exposure compensated image. The exposure compensated image may be based on the gain value applied to the first image circle, the gain value applied to the second image circle, or both.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

All figures disclosed herein are © Copyright 2018 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the similar reference numbers will be used throughout the drawings to refer to same or like parts.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image signal processor (ISP) may receive the image signal from one or more image sensors and may process the image signal to generate one or more processed images, pictures, or frames. Processing the images by the image signal processor may include identifying exposure information, such as exposure levels, representing exposure values between the respective images and/or reference data. For example, the image signal processor may perform exposure estimation to generate the exposure information. The image signal processor may output the processed images, which may include storing the processed images, such as in a memory of the image capture device. An encoder, such as an encoder included in the image capture device, may access the processed images output by the image signal processor and may generate corresponding encoded images by encoding the processed images. Encoding the processed images by the encoder may include performing exposure estimation to identifying exposure information, such as exposure levels, representing exposure values between the respective images and/or reference data.

Image signal processing and encoding including image signal processing-based exposure compensation. For example, image signal processing and encoding including image signal processing-based exposure compensation may include the image signal processor outputting the exposure information generated by the image signal processor as scaled exposure values and generating an exposure compensated image free or substantially free from artifacts resulting from differences in exposure levels at the stitch point of two or more images.

Figure 1:
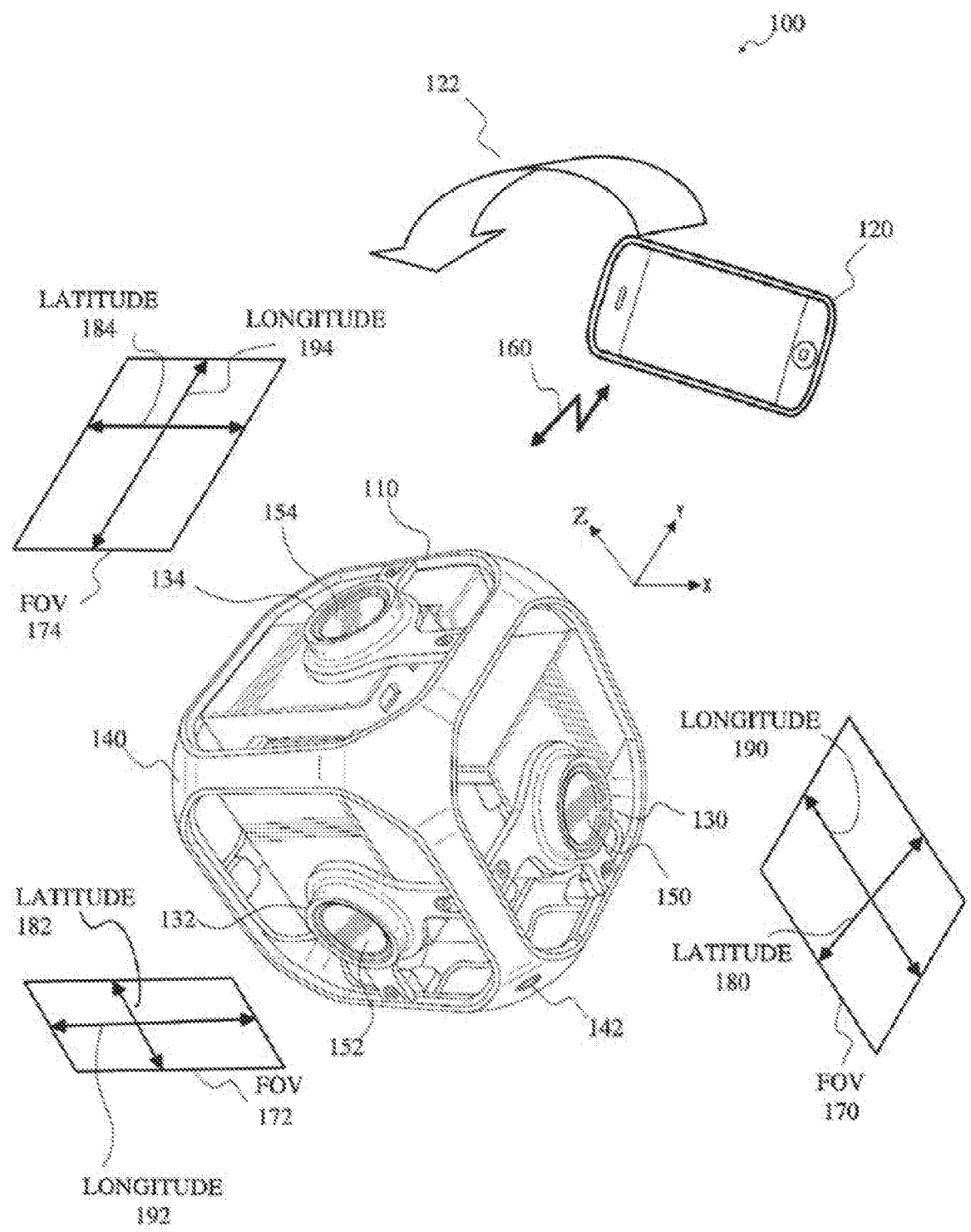
FIG. 1 is a diagram of an example of an image capture system for content capture in accordance with implementations of this disclosure.

FIG. 1 is a diagram of an example of an image capture system 100 for content capture in accordance with implementations of this disclosure. As shown in FIG. 1, an image capture system 100 includes an image capture apparatus 110, an external user interface (UI) device 120, or a combination thereof.

In some implementations, the image capture apparatus 110 may be a multi-face apparatus and may include multiple image capture devices. Such as image capture devices 130, 132, 134 are shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of the sides of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, respective image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, respective image capture devices 130, 132, 134 may have a respective field-of-view 170, 172, 174, such as a field-of-view 170, 172, 174 that 90° in a lateral, or latitudinal, dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the lateral dimension 184 of the field-of-view 174 for the image capture device 134, the lateral dimension 180 of the field-of-view 170 for the image capture device 130 may be oriented at 90° with respect to the longitudinal dimension 192 of the field-of-view 172 for the image capture device 132, and the lateral dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by respective image capture device 130, 132, 134 may be combined to form a panoramic image.

As shown in FIG. 1, an image capture device 130, 132, 134 includes a lens 150, 152, 154 or another optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, in some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be a High-Definition Multimedia Interface (HDMI)

link, a Universal Serial Bus (USB) link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

For example, a user may rotate, or sweep, the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, the GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application, such as the GoPro App, may generate and share, such as via a cloud-based or social media service, one or more images, or short video clips, such as in response to user input.

In some implementations, the user interface device 120, such as via an application, such as the GoPro App, may remotely control the image capture apparatus 110, such as in response to user input.

In some implementations, the user interface device 120, such as via an application, such as the GoPro App, may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application, such as the GoPro App, may mark one or more key moments contemporaneously with capturing the images or video by the image capture apparatus 110, such as with a HiLight Tag, such as in response to user input.

In some implementations, the user interface device 120, such as via an application, such as the GoPro App, may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application, such as the GoPro App, may wirelessly control camera software, hardware, or both. For example, the user interface device 120 may include a graphical interface accessible by a user for selecting a live or previously recorded video stream from the image capture apparatus 110 for display on the user interface device 120. The graphical interface may be web-based.

In some implementations, the user interface device 120 may receive information indicating a user setting, such as an image resolution setting, such as 3840 pixels by 2160 pixels, a frame rate setting, such as sixty frames per second (fps), a location setting, and/or a context setting, which may indicate an activity, such as mountain biking, in response to user input, and may communicate the settings, or related information, to the image capture apparatus 110.

Figure 2:
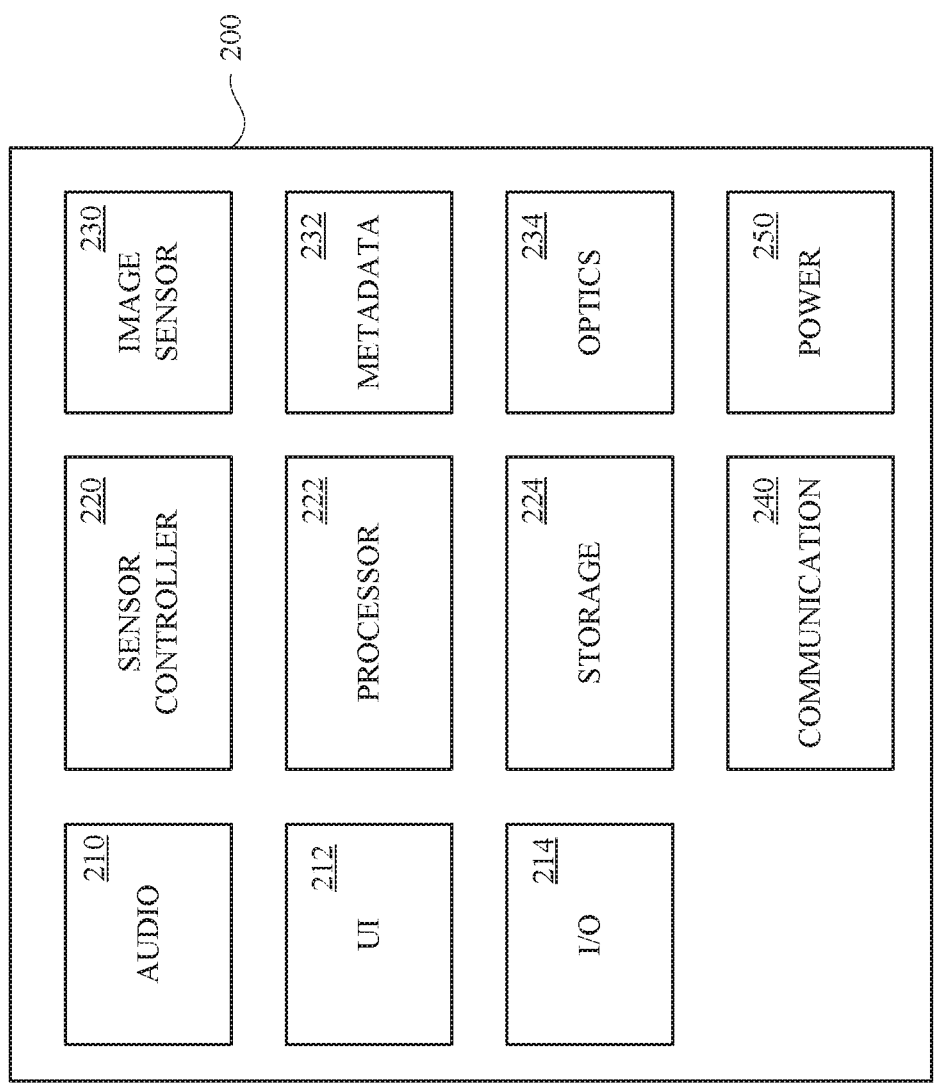
FIG. 2 is a block diagram of an example of an image capture device in accordance with implementations of this disclosure.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, for example, Advanced Audio Coding (AAC), Audio Compression—3 (AC3), Moving Picture Experts Group Layer-3 Audio (MP3), linear Pulse Code Modulation (PCM), Motion Picture Experts Group—High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements, such as buttons and/or virtual touch screen buttons, lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface, such as a Wi-Fi interface, a Bluetooth interface, a USB interface, an HDMI interface, a Wireless USB interface, an NFC interface, an Ethernet interface, a radio frequency transceiver interface, and/or other interfaces, for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, such as a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 200. In some implementations, the processor 222 may interface with the sensor controller 220 to obtain and process sensory information, such as for object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content, such as images or videos, captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 222 in accordance with a defined schedule, such as values of latitude, longitude, and elevation at 10 Hz.

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content, such as metadata, images, audio, or a combination thereof, captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 200 may contain one or more other sources of metadata information, telemetry, or both, such as image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a global positioning system sensor that may provide global positioning system coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a global positioning system unit as a second physical unit. In some implementations, the metadata unit 232, or one or more portions thereof, may be included in an image capture device 200 as shown or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular LTE, communications interface for communication between the image capture device 200 and a remote device, such as the user interface device 120 in FIG. 1. The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution, such as battery, solar cell, inductive, such as contactless, power source, rectification, and/or other power supply, may be used.

Consistent with the present disclosure, the components of the image capture device 200 may be remote from one another and/or aggregated. For example, one or more sensor components may be distal from the image capture device 200, such as shown and described with respect to FIG. 1. Multiple mechanical, sensory, or electrical units may be controlled by a learning apparatus via network/radio connectivity.

Figure 3:
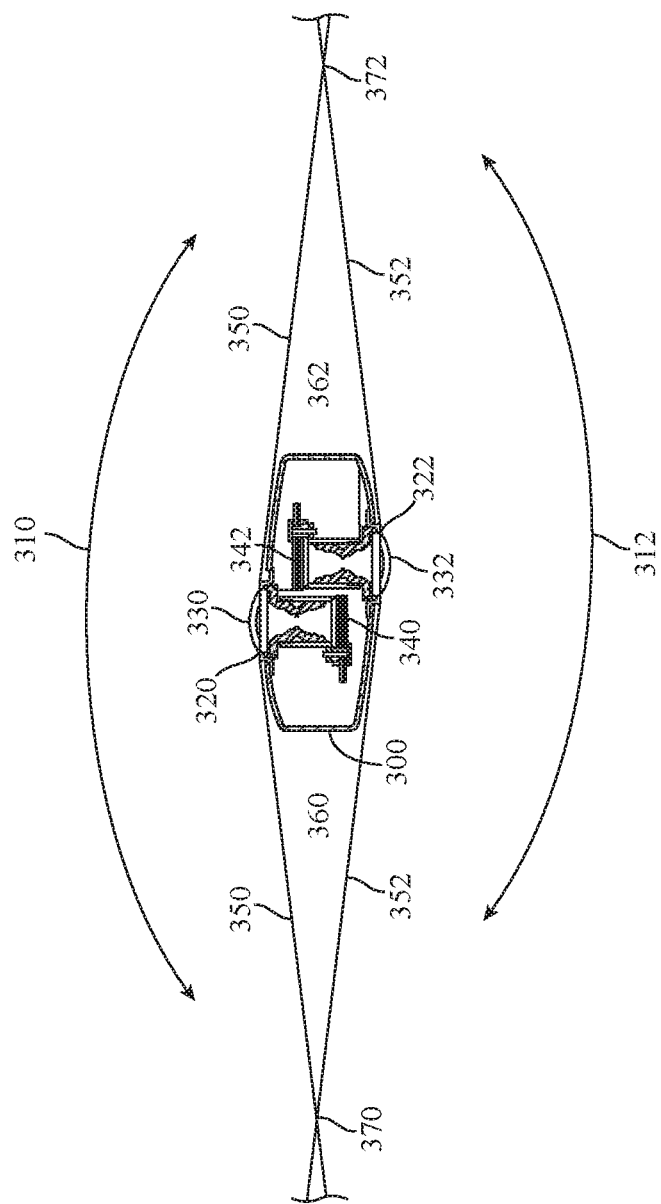
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 includes image capture devices 320, 322, related components, or a combination thereof, arranged in a back-to-back or Janus configuration. For example, a first image capture device 320 includes a first lens 330 and a first image sensor 340, and a second image capture device 322 includes a second lens 332 and a second image sensor 342 arranged oppositely from the first lens 330 and the first image sensor 340. Some examples of image capture devices 320 and 322 may include multiple lenses, multiple sensors, or both.

The first lens 330 of the image capture apparatus 300 has a field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 has a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment, such as position and/or tilt, of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses, such as lenses aligned along the same axis, the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 4:
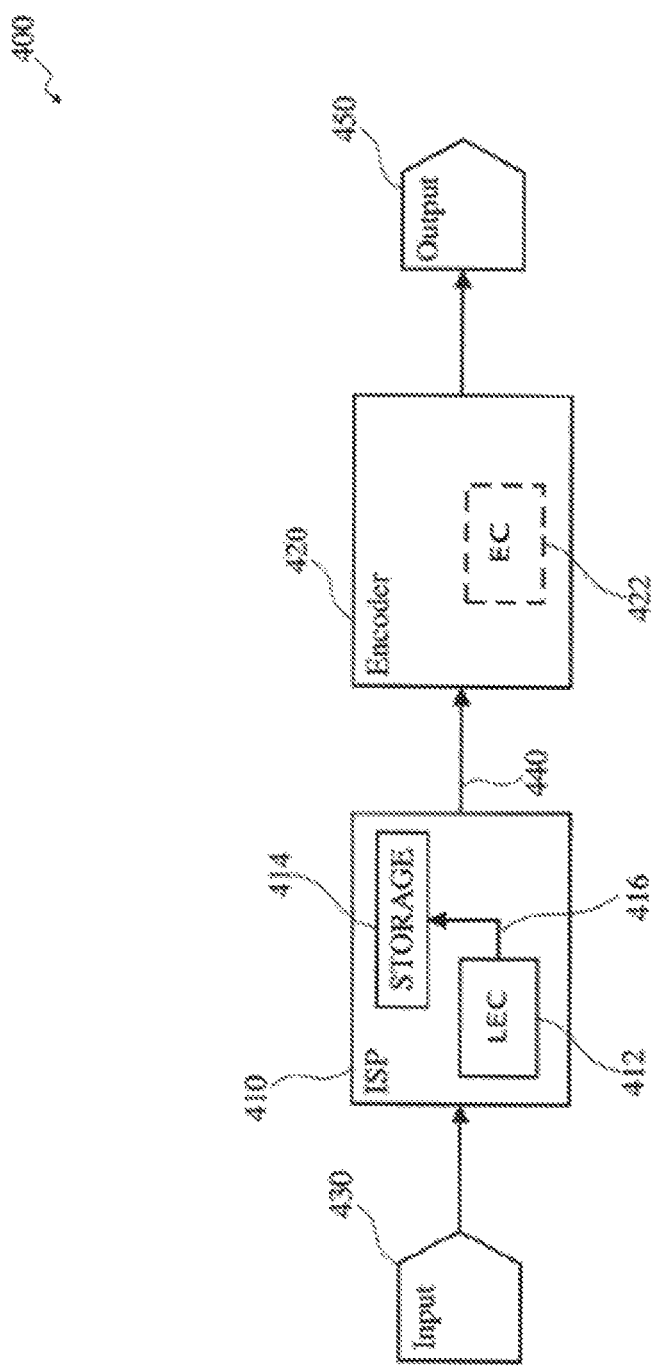
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

In some implementations, the image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

In some implementations, the image signal processor 410 may include a local exposure compensation unit 412, which may generate local exposure compensation information for use in image signal processing and encoding, such as in correcting distortion, stitching, and/or exposure compensation. In some implementations, the local exposure compensation unit 412 may partition the input image signal 430 into blocks, such as having 2×2, 4×4, 16×16, 64×64, and/or other dimensions. In some implementations, the local exposure compensation unit 412 may partition the input image signal 430 into arbitrarily shaped patches and/or individual pixels.

In some implementations, the local exposure compensation unit 412 may compare pixel values of blocks of pixels between image frames, such as successive image frames, from the input image signal 430 to determine displacement, or movement, between frames. The local exposure compensation unit 412 may produce exposure values at multiple locations within an image frame.

In some implementations, the image signal processor 410 of the image processing and coding pipeline 400 includes an internal electronic storage unit 414, such as shared memory, such as random-access memory (RAM), flash, or other types of memory. The internal electronic storage unit 414 may store local exposure compensation information 416 determined by the local exposure compensation unit 412 for one or more frames. The local exposure compensation information 416 and associated image or images may be output 440 to the encoder 420. In some implementations, the internal electronic storage unit 414 may include a buffer, or cache, and may buffer the input image signal as an input, or source, image, or frame.

In some implementations, the image signal processor 410 may output an image, associated local exposure compensation information 416, or both as the output 440. For example, the image signal processor 410 may receive the input image signal 430, process the input image signal 430, and output a processed image as the output 440. Processing the input image signal 430 may include generating and using the local exposure compensation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include exposure compensation.

In some implementations, the encoder 420 may output encoded video as an encoded output 450. For example, the encoder 420 may receive the output 440 of the image signal processor 410, which may include processed images, the local exposure compensation information 416, or both. The encoder 420 may encode the images and may output the encoded images as the encoded output 450.

In some implementations, the encoder 420 may include an exposure compensation unit 422 that may determine motion information for encoding the image output 440 of the image signal processor 410. In some implementations, the encoder 420 may encode the image output 440 of the image signal processor 410 using exposure information generated by the exposure compensation unit 422 of the encoder 420, the local exposure compensation information 416 generated by the local exposure compensation unit 412 of the image signal processor 410, or a combination thereof.

For example, the exposure compensation unit 422 may determine exposure information at pixel block sizes that may differ from pixel block sizes used by the local exposure compensation unit 412. In another example, the exposure compensation unit 422 of the encoder 420 may generate motion information and the encoder may encode the image output 440 of the image signal processor 410 using the exposure information generated by the exposure compensation unit 422 of the encoder 420 and the local exposure compensation information 416 generated by the local exposure compensation unit 412 of the image signal processor 410. In another example, the exposure compensation unit 422 of the encoder 420 may use the local exposure compensation information 416 generated by the local exposure compensation unit 412 of the image signal processor 410 as input for efficiently and accurately generating exposure compensation information.

In some implementations, the image signal processor 410, the encoder 420, or both are distinct units, as shown. For example, the image signal processor 410 may include an exposure compensation unit, such as the local exposure compensation unit 412 as shown, and/or the encoder 420 may include an exposure compensation unit, such as the exposure compensation unit 422.

In some implementations, the image signal processor 410 may store exposure compensation information, such as the local exposure compensation information 416, in a memory, such as the internal electronic storage unit 414, and the encoder 420 may read the exposure compensation information from the internal electronic storage unit 414 or otherwise receive the exposure compensation information from the image signal processor 410. The encoder 420 may use the exposure compensation information determined by the image signal processor 410 for exposure compensation processing.

Figure 5:
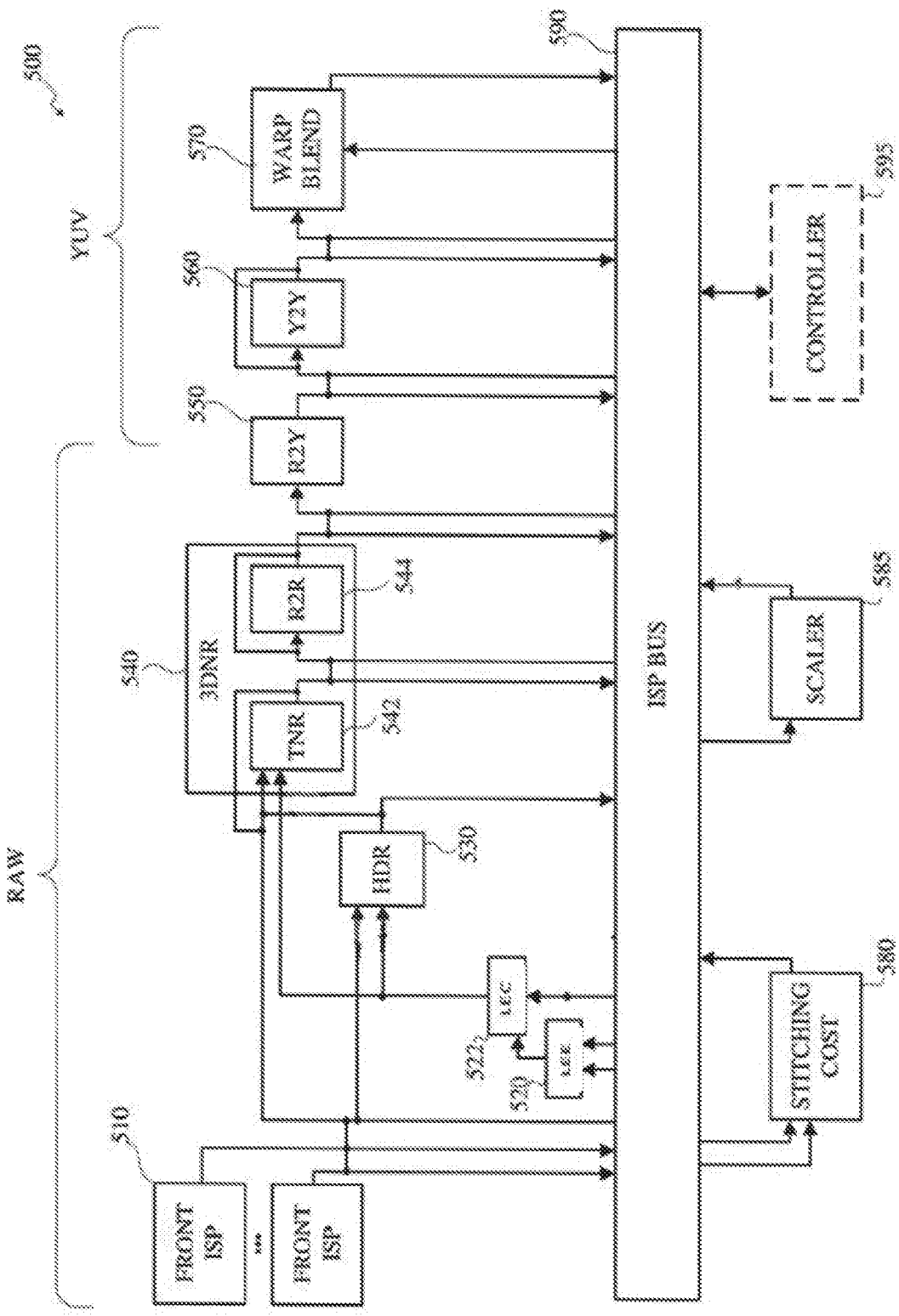
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern. For clarity, a sequence of pixels forming a Bayer pattern may be referred to herein as a Bayer. In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local exposure estimation unit 520, a local exposure compensation unit 522, a high dynamic range (HDR) unit 530, a three-dimensional noise reduction (3DNR) unit 540, which may include a temporal noise reduction (TNR) unit 542 and a raw to raw (R2R) unit 544, a raw to YUV (R2Y) unit 550, a YUV to YUV (Y2Y) unit 560, a warp and blend unit 570, a stitching cost unit 580, a scaler 585, an image signal processing bus (ISP BUS) 590, a configuration controller 595, or a combination thereof.

Although not shown expressly in FIG. 5, in some implementations, one or more of the front image signal processor 510, the local exposure estimation unit 520, the local exposure compensation unit 522, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high-resolution frame, one or more downscaled, or reduced, resolution frames, such as a ½×½ resolution frame, a ¼×¼ resolution frame, a ⅛×⅛ resolution frame, a 1/16×1/16 resolution frame, a 1/32×1/32 resolution frame, or any combination thereof.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with a respective image capture device.

The local exposure estimation unit 520 may receive, or otherwise access, an input frame, or one or more portions thereof, which may be a current input frame, such as via the image signal processor bus 590. In some implementations, the local exposure estimation unit 520 may receive the current input frame at a downscaled, or reduced, resolution. In some implementations, such as implementations implementing high dynamic range image processing, the current input frame may be a long exposure input frame.

The local exposure estimation unit 520 may receive, or otherwise access, a reference frame, or one or more portions thereof, such as via the image signal processor bus 590. The reference frame may be a previously generated exposure compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

In some implementations, the local exposure estimation unit 520 may receive, or otherwise access, previously generated exposure information, such as previously generated exposure values for the current input frame or exposure information for a previously processed frame.

The local exposure estimation unit 520 may determine exposure information, such as exposure gain values. The local exposure estimation unit 520 may output the exposure information. For example, the local exposure estimation unit 520 may output exposure gain values to the local exposure compensation unit 522.

The local exposure compensation unit 522 may receive, or otherwise access, a reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The local exposure compensation unit 522 may receive, or otherwise access, exposure information, such as exposure gain values, associated with the current input frame. For example, the local exposure compensation unit 522 may receive the exposure gain values from the local exposure estimation unit 520.

The local exposure compensation unit 522 may apply the exposure gain values to the reference frame, or one or more portions thereof, which may align, or partially align, the reference frame, or one or more portions thereof, with the current input frame, or one or more portions thereof.

The local exposure compensation unit 522 may output a local exposure compensated reference frame, or one or more portions thereof.

The high dynamic range unit 530 may receive, or otherwise access, the current input frame, or one or more portions thereof, such as from the front image signal processor 510. The current input frame may be a long exposure input frame corresponding to the short exposure reference frame. The high dynamic range unit 530 may receive, or otherwise access, the local exposure compensated reference frame from the local exposure compensation unit 522.

The high dynamic range unit 530 may generate a high dynamic range image based on the current input image and the local exposure compensated reference frame. For example, for a respective portion of the reference frame, such as a respective block, a respective pixel, or a respective Bayer, the temporal noise reduction unit 530 may identify a value for the portion based on the corresponding portion of the local exposure compensated reference frame.

The high dynamic range unit 530 may output the high dynamic range image. For example, the high dynamic range unit 530 may output the high dynamic range image by storing the high dynamic range image in memory, such as shared memory, via the image signal processor bus 590, or the high dynamic range unit 530 may output the high dynamic range image directly to another unit of the image signal processor 500, such as the temporal noise reduction unit 542.

In some implementations, the high dynamic range unit 530 may be omitted, or high dynamic range processing by the high dynamic range unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, the local exposure compensated reference frame from the local exposure compensation unit 522.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local exposure compensation unit 522. For example, for a respective portion of the reference frame, such as a respective block, a respective pixel, or a respective Bayer, the temporal noise reduction unit 530 may identify a value for the portion based on the corresponding portion of the local exposure compensated reference frame.

The temporal noise reduction unit 542 may generate output including a pixel value and associated noise variance for the pixel value for one or more pixels of the current input frame.

The raw to raw unit 544 may perform spatial denoising of frames of raw images based on noise variance values received from the temporal noise reduction unit 542. For example, spatial denoising in the raw to raw unit 544 may include multiple passes of image signal processing, including passes at various resolutions.

The raw to YUV unit 550 may demosaic, and/or color process, the frames of raw images, which may include representing respective pixels in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of a respective frame to a rectangle. For example, the warp and blend unit 570 may warp a corona around the equator of a respective frame to a rectangle based on the corresponding low-resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear, such as fisheye, images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity (x) and longitude (y) based on a warping. Respective values of the cost map may be a cost function of a disparity (x) value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front image signal processor 510, the temporal noise reduction unit 542, the local exposure compensation unit 522, the raw to raw unit 544, the raw to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local exposure estimation unit 520, the local exposure compensation unit 522, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
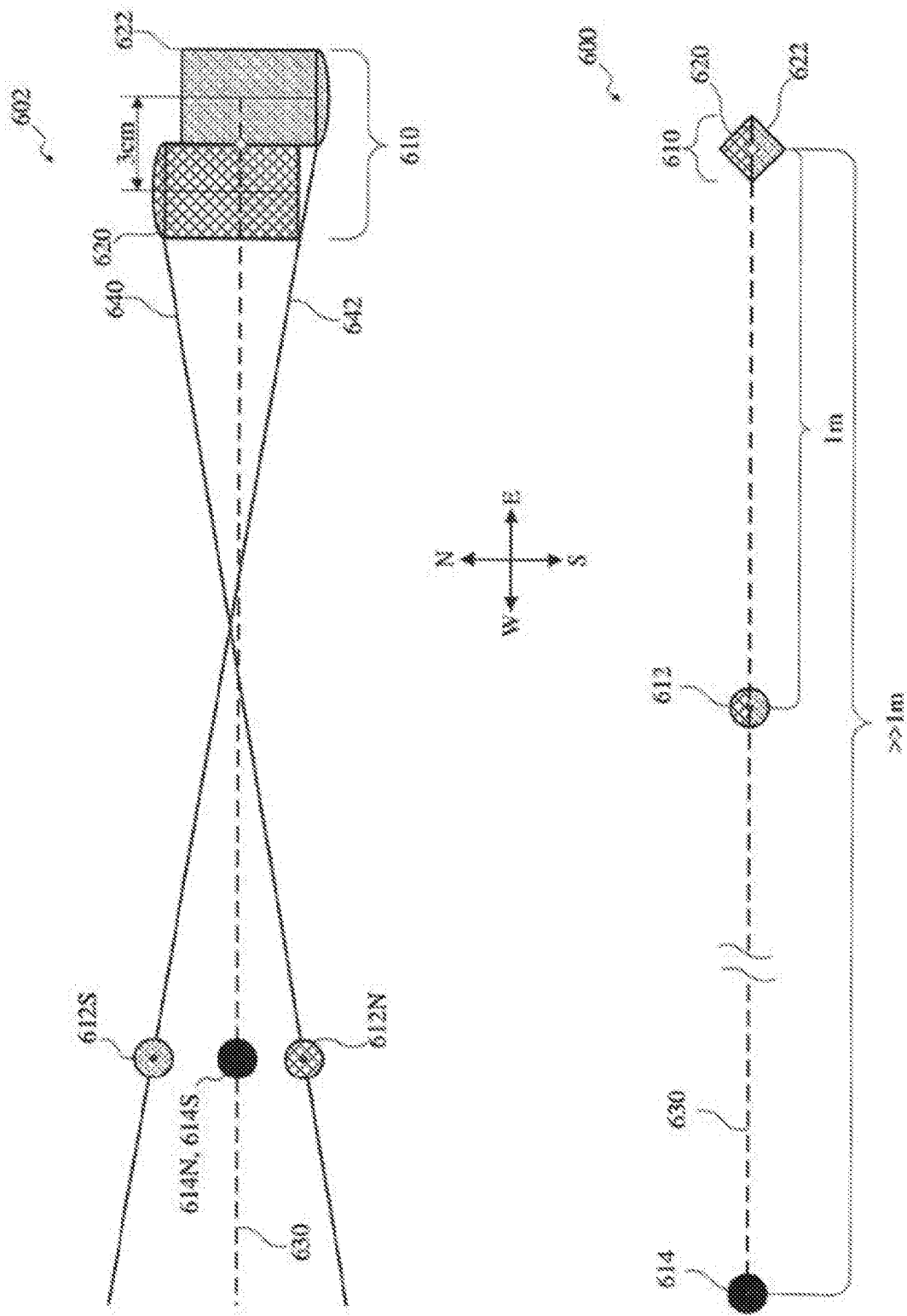
FIG. 6 is a diagram of an example of spatial and field-of-view representations of overlapping field-of-view for adaptive camera model calibration in accordance with implementations of this disclosure.

FIG. 6 is a diagram of an example of spatial and field-of-view representations of overlapping field-of-view for adaptive camera model calibration in accordance with implementations of this disclosure. FIG. 6 is shown as oriented with north at the top and east at the right and is described with reference to longitude and latitude for simplicity and clarity; however, any orientation may be used, direction, longitude, and latitude are described with reference to the image capture apparatus or the respective image capture devices and may differ from geographic analogs.

FIG. 6 includes a lower portion showing a spatial representation 600 of an image capture apparatus 610 including a near object 612 and a far object 614 and an upper portion showing a corresponding field-of-view representation 602 for the image capture apparatus 610 including near object content 612N as captured by the north facing image capture device 620, near object content 612S as captured by the south facing image capture device 622, far object content 614N as captured by the north facing image capture device 620, and far object content 614S as captured by the south facing image capture device 622.

In the spatial representation 600, the image capture apparatus 610, which may be a multi-face image capture apparatus, such as the image capture apparatus 110 shown in FIG. 1 or the image capture apparatus 300 shown in FIG. 3, is represented by a diamond. In some implementations, the multi-face image capture apparatus 610 may include two or more image capture devices 620, 622, such as the image capture device 200 shown in FIG. 2, which may have overlapping field-of-view. In the lower portion of FIG. 6, the north facing image capture device 620 is indicated as a triangle with a cross hatched background, and the south facing image capture device 622 is indicated as a triangle with a stippled background. An equator 630, which may be a midpoint between the two image capture devices 620, 622, is indicated by a broken line.

In the spatial representation 600, the near object 612, which may be captured, in whole or in part, in one or more images captured by the image capture devices 620, 622, is shown as a circle, along the equator 630, having a north half with a cross-hatched background and a south half having a stippled background. The near object 612 may be a relatively short distance from the image capture apparatus 610, such as one meter (1 m) as shown. The far object 614, which may be captured, in whole or in part, in one or more images captured by the image capture devices 620, 622, is shown as a black circle along the equator 630. The far object 614 may be a relatively long distance from the image capture apparatus 610, such as a distance much greater than 1 meter (>>1 m) as shown. For example, the far object 614 may be near the horizon.

In the field-of-view representation 602, the north facing image capture device 620 is shown on the left of the image capture apparatus 610, facing north, with a cross hatched background, and the corresponding north field-of-view is partially represented as including content above, such as north of, a north field-of-view boundary 640. The south facing image capture device 622 of the image capture apparatus 610 is shown on the right, facing south, with a stippled background, and the corresponding south field-of-view is partially represented as including content below, such as south of, a south field-of-view boundary 642.

In some implementations, the respective fields-of-view for the image capture devices 620, 622 may include a defined N° longitudinal dimension, such as 360° of longitude, and may include a defined N° lateral dimension, which may be greater than 180° of latitude. For example, the north facing image capture device 620 may have a field-of-view that extends 10° latitude below the equator 630 as represented by the north field-of-view boundary 640, and the south facing image capture device 622 may have a field-of-view that extends 10° latitude above the equator 630, as represented by the south field-of-view boundary 642. The overlapping region may include 360° of longitude and may include 20° of latitude, which may include a range of 10° north latitude to 10° south latitude.

In some implementations, the image capture devices 620, 622 may be physically offset along one or more spatial axis. For example, as shown in the field-of-view representation 602, the north facing image capture device 620 is offset vertically, such as north-south, and horizontally. In the example shown in FIG. 6, the horizontal, or longitudinal, offset between the image capture devices 620, 622, or between the respective optical centers of the image capture devices 620, 622, is 3 cm; however, other offsets may be used.

As shown in the spatial representation 600, the near object 612 is positioned along the equator 630 and is positioned relatively proximal to the image capture apparatus 610, such as one meter (1 m). The far object 614 is positioned along the equator and is positioned relatively distal (>>1 m) from the image capture apparatus 610. For simplicity and clarity, the distance of the far object 614 may be, as an example, three kilometers from the spatial center of the image capture apparatus 610 as indicated by the small white diamond in the image capture apparatus 610.

As shown in the field-of-view representation 602, the optical center of the north facing image capture device 620 may be offset from the spatial center of the image capture apparatus 610 horizontally by a defined amount, such as by 1.5 cm west laterally, and vertically by a defined amount, such as by 1.5 cm north longitudinally, and the optical center of the south facing image capture device 622 may be offset from the spatial center of the image capture apparatus 610 horizontally by a defined amount, such as by 1.5 cm east laterally, and vertically by a defined amount, such as by 1.5 cm south longitudinally.

In the field-of-view representation 602, the near object content 612N as captured by the north facing image capture device 620, corresponding to the near object 612 shown in the spatial representation 600, the near object content 612S as captured by the south facing image capture device 622, corresponding to the near object 612 shown in the spatial representation 600, the far object content 614N as captured by the north facing image capture device 620, corresponding to the far object 614 shown in the spatial representation 600, and the far object content 614S as captured by the south facing image capture device 622, corresponding to the far object 614 shown in the spatial representation 600, are shown vertically aligned at an intermediate distance from the image capture apparatus 610 to indicate that distance information for the near object 612 and the far object 614 may be unavailable independent of analyzing the images.

In the field-of-view representation 602, the far object content 614N as captured by the north facing image capture device 620 and the far object content 614S as captured by the south facing image capture device 622 are shown along the equator 630 indicating that the position of the far object content 614N as captured by the north facing image capture device 620 may be indistinguishable from the position of the far object content 614S as captured by the south facing image capture device 622. For example, the far object 614, as shown in the spatial representation 600, may be approximately 2,999.9850000375 meters at an angle of approximately 0.00028648° from the optical center of the north facing image capture device 620 and may be approximately 3,000.0150000375 meters at an angle of approximately 0.00028647° from the optical center of the south facing image capture device 622. The angular difference of approximately one hundred-millionth of a degree between the location of the far object 614 relative to the optical center of the north facing image capture device 620 and the location of the far object 614 relative to the optical center of the south facing image capture device 622 may correspond to a difference of zero pixels in the corresponding images.

The position of the near object 612 may differ in the respective images captured by the image capture devices 620, 622. In the field-of-view representation 602, the near object content 612N as captured by the north facing image capture device 620 is shown with a cross-hatched background below the equator 630 indicating that the position of the near object content 612N as captured by the north facing image capture device 620 may be slightly below the equator 630, such as 1° south latitude, and the near object content 612S as captured by the south facing image capture device 622 is shown with a stippled background above the equator 630 indicating that the position of the near object content 612S as captured by the south facing image capture device 622 may be slightly above the equator 630, such as 1° north latitude. For example, the near object 612, as shown in the spatial representation 600, may be approximately 1.01511083 meters at an angle of approximately 0.846674024° from the optical center of the north facing image capture device 620, and may be approximately 0.985114207 meters at an angle of approximately 0.872457123° from the optical center of the south facing image capture device 622. The angular difference of approximately 1.72° between the location of the near object 612 relative to the optical center of the north facing image capture device 620 and the location of the near object 612 relative to the optical center of the south facing image capture device 622 may correspond to a difference of one or more pixels in the corresponding images.

In some implementations, images captured by the image capture devices 620, 622 may be combined to generate a combined image wherein overlapping regions and transitions between overlapping regions, such as portions corresponding to field-of-view boundaries 640, 642, are visually cohesive. In some implementations, combining images may include aligning overlapping regions of the images to adjust for differences between the relative locations of the respective image capture devices 620, 622 and the content captured by the images. In some implementations, aligning overlapping regions of images may be based on the physical alignment of the respective image capture devices 620, 622 of the image capture apparatus 610, the distance between the respective image capture devices 620, 622 of the image capture apparatus 610 and the content captured by the images, or both. An example of image alignment is shown in FIG. 7.

Figure 7:
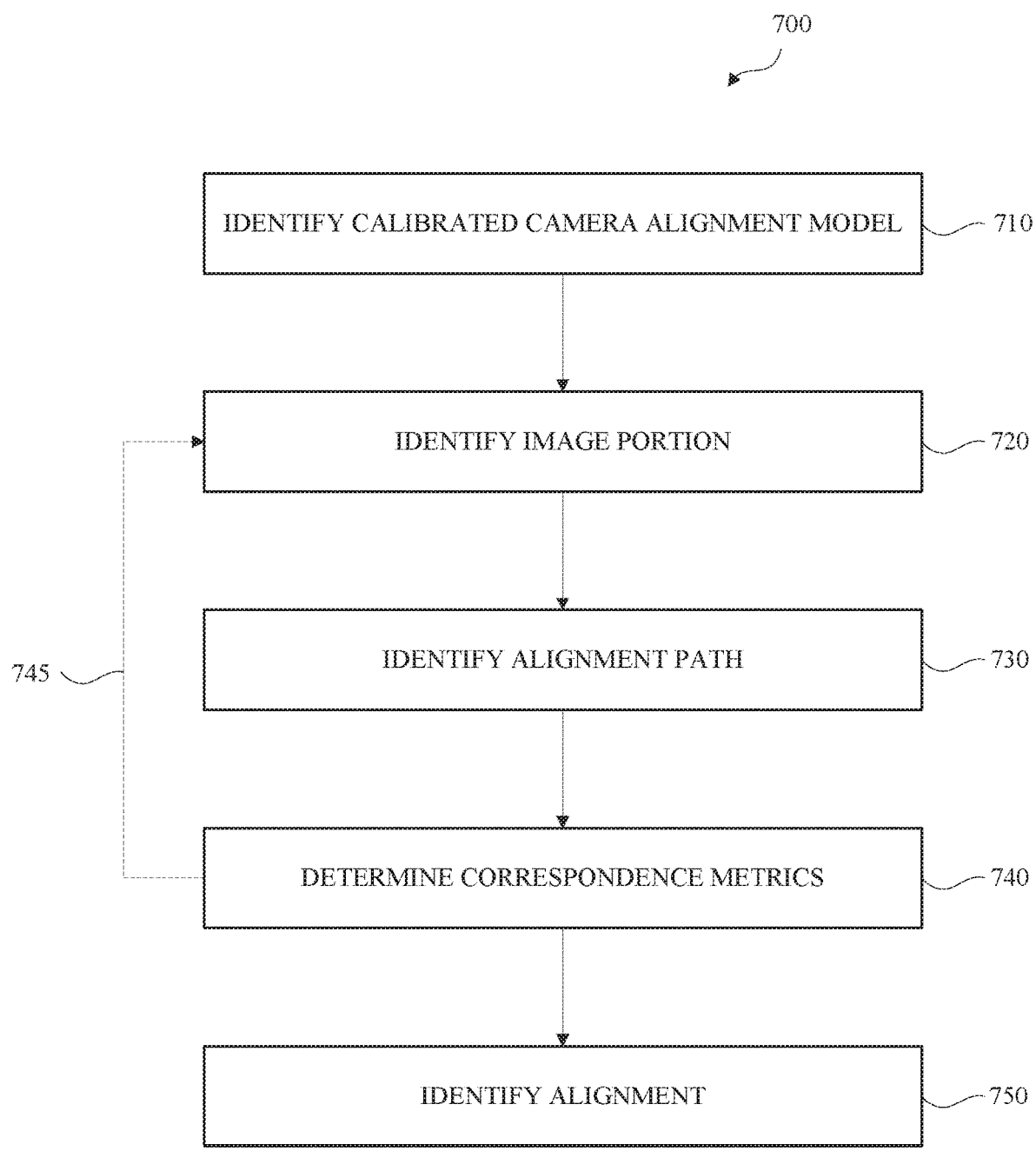
FIG. 7 is a flowchart of an example of aligning overlapping image regions in accordance with implementations of this disclosure.

FIG. 7 is a flowchart of an example method for aligning overlapping image regions 700 in accordance with implementations of this disclosure. In some implementations, aligning overlapping image regions 700 may be implemented in an image capture apparatus, such as the image capture apparatus 110 shown in FIG. 1, the image capture apparatus 300 shown in FIG. 3, or the image capture apparatus 610 shown in FIG. 6. For example, a stitching cost unit, such as the stitching cost unit 580 of the image signal processor 500 shown in FIG. 5, may implement aligning overlapping image regions 700. In some implementations, aligning overlapping image regions 700 may include identifying a calibrated camera alignment model at 710, identifying image portions corresponding to defined relative space at 720, identifying an alignment path at 730, determining correspondence metrics at 740, identifying an alignment at 750, or a combination thereof.

Although not shown separately in FIG. 7, an image signal processor, such as the image signal processor 410 shown in FIG. 4 or the image signal processor 500 shown in FIG. 5, which may be included in an image capture apparatus, may receive one or more input image signals, such as the input image signal 430 shown in FIG. 4, from one or more image sensors, such as the image sensor 230 shown in FIG. 2 or the image sensors 340, 342 shown in FIG. 3, or from one or more front image signal processors, such as the front image signal processors 510 shown in FIG. 5, and may identify one or more input images, or frames, from the one or more input image signals, which may include buffering the input images or frames. In some implementations, the input images or frames may be associated with respective temporal information indicating a respective temporal location, such as a time stamp, a date stamp, sequence information, or a combination thereof. For example, the input images or frames may be included in a stream, sequence, or series of input images or frames, such as a video, and respective input images or frames may be associated with respective temporal information.

In some implementations, a calibrated camera alignment model may be identified at 710. In some implementations, an image capture apparatus may include a memory, such as the electronic storage unit 224 shown in FIG. 2, and a calibrated camera alignment model may be read from the memory, or otherwise received by the image capture apparatus. For example, the calibrated camera alignment model may be a previously generated calibrated camera alignment model, such as a calibrated camera alignment model calibrated based on one or more previously captured images or frames.

A camera alignment model for image capture devices having overlapping fields-of-view may indicate an expected correspondence between the relative spatial orientation of the fields-of-view and portions, such as pixels, in overlapping regions of corresponding images captured by the image capture devices. The relative spatial orientation of the fields-of-view may correspond with a physical alignment of the respective image capture devices and may be expressed in terms of relative longitude and latitude.

In some implementations, a camera alignment model may include one or more parameters for use in aligning the overlapping images. For example, a camera alignment model may indicate one or more portions, such as pixels, of an overlapping region of an image, one or more of which is expected to correspond with a defined relative longitude. For example, the one or more portions may be expressed as a path of pixels, respective pixels corresponding to a respective relative latitude, on or near a defined longitude, which may be referred to herein as an alignment path, or epipolar. In some implementations, the calibrated camera alignment model may vary based on image resolution.

In some implementations, the correspondence between the expected relative alignment of the overlapping fields-of-view captured by respective images of an image capture apparatus and the respective images may be described by a camera alignment model and may be referred to herein as the defined relative space. For example, a camera alignment model may indicate a portion, such as a pixel, of a first image that is expected to correspond with a defined location in the defined relative space, such as at the relative prime meridian (0° relative longitude) and the relative equator (0° relative latitude), and may indicate a corresponding portion, such as a corresponding pixel, of the second image that is expected to align with the pixel in the first image at the defined location, conditioned on the distance of the content captured at the respective portions of the images being greater than a threshold, wherein the threshold indicates a maximum distance from the image capture apparatus for which angular distances translate to pixel differences.

In some implementations, an expected camera alignment model may indicate an expected alignment of image capture devices, which may differ from the physical alignment of the image capture devices concurrent with capturing images. A calibrated camera alignment model may be a camera alignment model, such as an expected camera alignment model, calibrated based on captured images to correspond with the contemporaneous physical alignment of the image capture devices.

In some implementations, one or more image portions corresponding to defined relative space may be identified at 720. For example, a first image portion, which may be a point, such as a first pixel, at the relative prime meridian (0° relative longitude) and the relative equator (0° relative latitude) in a first image, and a second image portion, such as a second pixel, at the relative prime meridian (0° relative longitude) and the relative equator (0° relative latitude) in a second image may be identified. The relative equator may correspond with the vertical center of the overlap area, which may be N° from the edge of the respective fields-of-view, which may correlate with M pixels from the edge of the respective images.

In some implementations, an alignment path may be identified at 730. The alignment path, or epipolar, may indicate a path, which may be vertical, or approximately vertical, from the point identified at 720 to a point along the edge of the image. In some implementations, the alignment path, or epipolar, may be a path along the longitude of the point identified at 720. For example, the two image capture devices may be aligned in a back-to-back configuration, with optical centers aligned along an axis, and the epipolar may be a path along a longitude. In some implementations, the alignment path, or epipolar, may be described by the calibrated camera alignment model. For example, the image capture devices may be aligned in an offset configuration, such as the configuration shown in FIG. 6, and the alignment path may be a function, which may be similar to a sinusoidal waveform, of the camera alignment relative to longitude and latitude. In some implementations, an alignment path for one frame may correspond to a respective alignment path for the other frame. In some implementations, an alignment path may begin at a first end, such as at a location, which may be a portion, such as a pixel, of the image, along, or proximate to, a defined relative longitude, such as the relative prime meridian, and a defined relative latitude, such as the relative equator, of an image, end at a second end, such as at a location, which may be a portion, such as a pixel, of the image, along, or proximate to, the defined relative longitude and the edge of an image which may be distal from the relative equator with respect to the optical center of the image capture device.

In some implementations, one or more correspondence metrics may be determined at 740. In some implementations, a group, or block, such as a 13×13 block of pixels, centered on the first pixel identified at 720 may be identified from the first image, and a group, or block, such as a 13×13 block of pixels, centered on the second pixel identified at 720 may be identified from the second image. A difference, or match quality metric, may be determined as a difference between the first block from the first frame and the second block from the second frame. For example, the match quality metric may be determined as a sum of squared differences (SSD), a weighted sum of squared differences, or other difference metric, between the two blocks.

In some implementations, determining the correspondence metrics may include determining a match quality metric for a respective point along the alignment paths, which may be performed iteratively or in parallel. For example, a match quality metric may be determined for the two blocks corresponding to the current relative longitude and the relative equator (0° relative latitude), and a second match quality metric may be determined for two blocks corresponding to a respective point, or pixel, in a respective frame along the current alignment path and defined distance, such as 0.1° latitude, toward the edge of the respective frame, which may be 0.1° north in the south frame and 0.1° south in the north frame. Respective match quality metrics, such as approximately 150 match quality metrics, may be determined for blocks at a respective point, or pixel, along the respective alignment paths, at defined latitude distance intervals. In some implementations, a two-dimensional (2D) cost map may be generated. A first dimension of the two-dimensional cost map may indicate a longitude for a respective match quality metric. A second dimension of the two-dimensional cost map may indicate a number, or cardinality, of pixels, which may be a spatial difference, between the corresponding pixel and the point, or pixel, at the origin of the alignment path, which may be referred to herein as a disparity. A value of the two-dimensional cost map for an intersection of the first and second dimensions of the two-dimensional cost map may be the corresponding match quality metric. Although the blocks in the two frames are described as being at corresponding, or symmetrical, latitude positions along the respective alignment paths, in some implementations, other correspondence metrics may be determined. For example, a correspondence metric may be determined based on differences between points along the alignment path in one frame and one or more points at different latitudes along the alignment path in the other frame.

In some implementations, identifying image portions corresponding to defined relative space at 720, identifying an alignment path at 730, determining correspondence metrics at 740, or a combination thereof may be performed for two or more longitudes as indicated by the broken line at 745. For example, identifying image portions corresponding to defined relative space at 720, identifying an alignment path at 730, and determining correspondence metrics at 740 may be performed for a respective defined longitudinal distance, such as each 0.5° of longitude, or a defined pixel distance corresponding to a defined longitudinal distance as a function of a resolution of the captured images.

Figure 8:
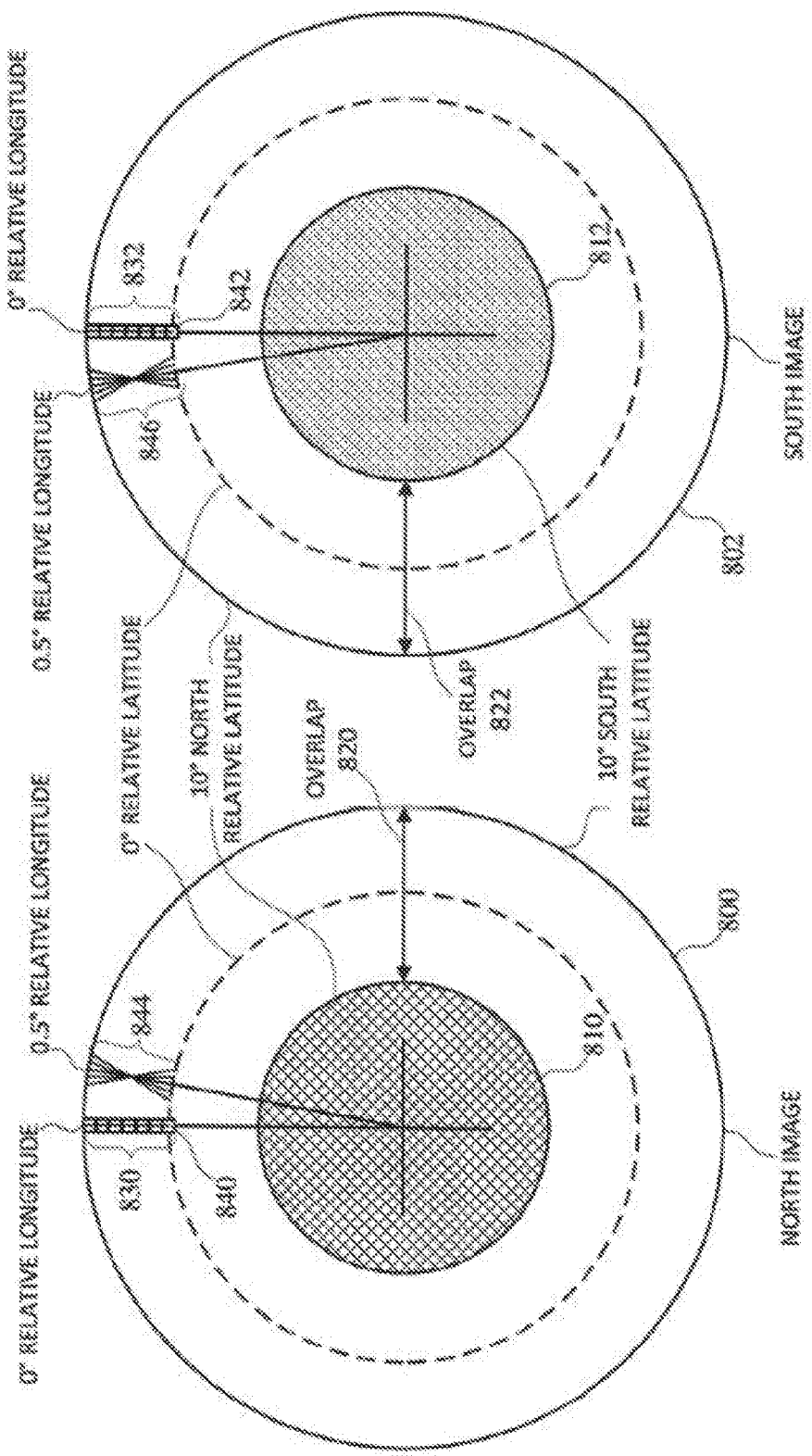
FIG. 8 is a diagram of elements of aligning overlapping image regions in accordance with this disclosure.

In some implementations, an alignment for the current images may be identified at 750. In some implementations, identifying the alignment for the current images at 750 may include simultaneously optimizing the correspondence metrics and a smoothness criterion. For example, identifying the alignment for the current images at 750 may include identifying one or more disparity profiles from the correspondence metrics, such as from the cost map generated at 740. A disparity profile from the correspondence metrics may include a discrete per longitude sequence of match quality metrics. For example, a disparity profile may include, for a respective longitude, such as each 0.5° of longitude, a disparity and a corresponding match quality metric. Optimizing the correspondence metrics may include identifying the minimal match quality metric for respective longitudes. Optimizing the smoothness criterion may include minimizing a sum of absolute differences in the disparity between adjacent longitudes. Simultaneously optimizing may include identifying a disparity profile representing a latitude per longitude evaluated, having a minimal cost, which may be a sum of match quality metrics, subject to the smoothness criterion. For example, a difference between the disparity corresponding to a minimal match quality metric for a longitude and the disparity corresponding to a minimal match quality metric for an adjacent longitude may exceed a defined threshold, which may indicate that the low match quality metric represents a false positive, and the second smallest match quality metric for one or both of the longitudes may be used. An example of elements of aligning overlapping image regions is shown in FIG. 8.

In some implementations, identifying the disparity profile may include generating disparity profiles at multiple scales, which may include generating match cost metrics at each of a defined set of scales. In some implementations, the disparity profile may be identified based on a low-resolution frame, such as low-resolution frame generated by the front image signal processor 510 shown in FIG. 5.

In some implementations, simultaneously optimizing the correspondence metrics and a smoothness criterion may include determining a weighted sum of the correspondence metrics and the smoothness criterions for respective disparity profiles and identifying the minimal weighted sum as the simultaneously optimized disparity profile. For example, simultaneously optimizing may include, for a disparity profile (p), determining a sum of the match quality metrics along the disparity profile as a first cost (c1), determining a sum of the absolute difference between successive disparity values as a cost (c2), and determining a simultaneously optimized disparity profile ($p_{so}$) using a first weight (w1) representing the relative importance of the first cost and a second weight (w2) representing a relative importance of the second cost, which may be expressed as $p_{so}$=w1*c1+w2*c2. Although weighted averaging is described herein, other combining functions may be used.

For example, 724 longitudes may be evaluated in respective frames, which may include determining correspondence metrics for 724 alignment paths, which may be approximately one alignment path per 0.5° longitude for 360°, determining correspondence metrics for a respective alignment path may include determining 150 match quality metrics, which may correspond to 150 latitudes evaluated per longitude evaluated, which may be approximately one match quality metric per 0.1° latitude for 10°, determining the correspondence metrics may include determining 108600 (724*150) match quality metrics, and simultaneously optimizing may include identifying a disparity profile including 724 of the 108600 match quality metrics.

In an example, content captured by the overlapping regions of the image capture devices along the equator far, such as three kilometers, from the image capture apparatus, may correspond with match quality metrics corresponding to a relatively small disparity, such as zero, which may correspond to a position at or near the equator, and content captured by the overlapping regions of the image capture devices along the equator near, such as one meter, to the image capture apparatus, may correspond with match quality metrics corresponding to a relatively large disparity, such as a disparity corresponding to a position at or near the edge of the images, such as at 10° latitude.

FIG. 8 is a diagram of elements of aligning overlapping image regions in accordance with this disclosure. FIG. 8 shows a north circular frame 800 and a south circular frame 802. The north circular frame 800 includes a non-overlapping region 810 indicated with a cross-hatched background, and an overlapping region 820. The south circular frame 802 includes a non-overlapping region 812 indicated with a stippled background, and an overlapping region 822. In some implementations, the longitudes in a frame, such as the north frame 800 as shown, may be oriented clockwise, and the longitudes in a corresponding frame, such as the south frame 802 as shown, may be oriented counterclockwise.

The overlapping regions 820, 822 of the north circular frame 800 and the south circular frame 802 may be aligned as shown in FIG. 7. For example, in the north circular frame 800, blocks 830, such as a 13×13 block of pixels, may be identified along an alignment path 840 beginning at 0° relative longitude and 0° relative latitude and ending along the edge of the frame 800, which may be at a distal relative latitude, such as 10° south latitude, as shown. In the south circular frame 802, corresponding blocks 832 may be identified along a corresponding alignment path 842 beginning at 0° relative longitude and 0° relative latitude and ending along the edge of the frame 802, which may be at 10° north latitude, as shown. Correspondence metrics may be determined based on differences between the identified blocks 830 from the north circular frame 800 and the spatially corresponding blocks 832 from the south circular frame 802.

In the north circular frame 800, candidate alignment paths 844 are shown for the 0.5° relative longitude, a respective path beginning at 0° relative latitude and ending along the edge of the north circular frame 800, to indicate that correspondence metrics may be determined at respective defined distances longitudinally and to indicate that for each respective longitude, multiple candidate alignment paths 844 may be evaluated. For example, a first candidate alignment path from the candidate alignment paths 844 may be orthogonal to the equator, which may be aligned along the respective longitude, and respective other candidate alignment path from the candidate alignment paths 844 may be angularly offset relative to the longitude as shown. FIG. 8 is not to scale. Although the blocks are shown as adjacent, the blocks may overlap horizontally, vertically, or both. Although seven blocks and two alignments paths are shown for simplicity, any number of blocks and alignment paths may be used. For example, 724 alignment paths, which may correspond with approximately 0.5° longitudinal intervals, may be used, and 150 blocks per alignment path, which may correspond with approximately 0.1° latitude intervals, may be used. Corresponding candidate alignment paths 846 are shown in the south circular frame 802. In some implementations, a number, or cardinality, of points, such as pixels, indicated by each respective candidate alignment path 844 may be a defined cardinality, such as 150 points, and each respective point from a candidate alignment path 844 may be offset, or shifted, from a corresponding point in another candidate alignment path 844 parallel to the equator. In some implementations, a candidate alignment path 844, or a portion thereof, for a longitude may overlap a candidate alignment path, or a portion thereof, for an adjacent longitude.

In some implementations, a camera alignment model may be based on the physical orientation of elements of the image capture device, such as the physical alignment of lenses, image sensors, or both. Changes in the physical orientation of elements of one or more of the image capture devices having overlapping fields-of-view may cause misalignment such that aligning overlapping image regions, such as the aligning overlapping image regions 700 shown in FIG. 7, based on a misaligned camera alignment model may inaccurately or inefficiently align image elements, such as pixels. For example, misalignment of image capture devices may occur during fabrication such that the alignment of image capture devices having overlapping field-of-view may differ from an expected alignment. In another example, the physical orientation of elements of an image capture device may change, such as in response to physical force, temperature variation, material aging or deformation, atmospheric pressure, or any other physical or chemical process, or combination of processes, that may change image capture device alignment. In some implementations, camera alignment model calibration may include updating, adjusting, or modifying a camera alignment model based on identified changes in the physical orientation of elements of one or more of the respective image capture devices. An example of camera alignment model calibration is shown in FIG. 9.

Figure 9:
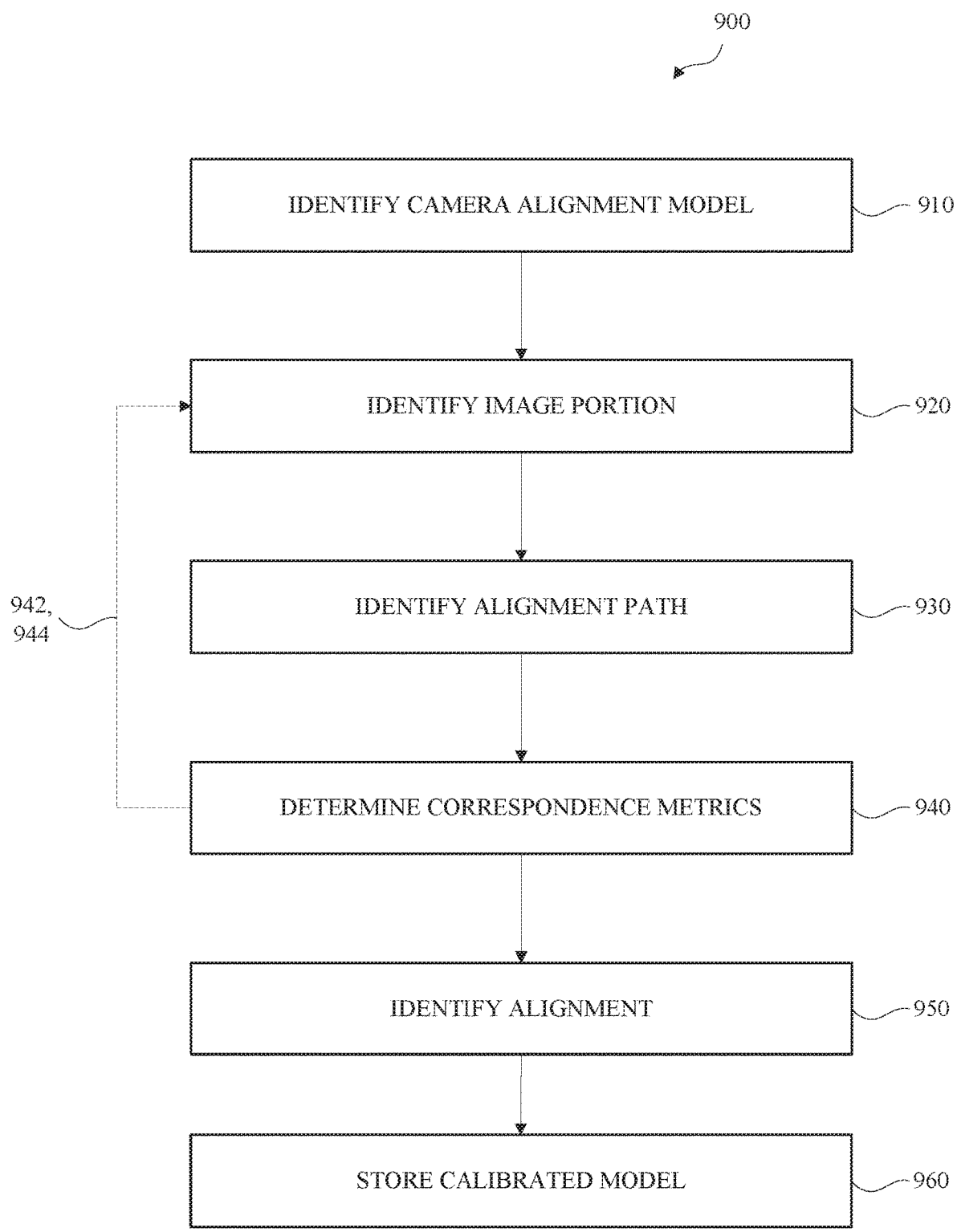
FIG. 9 is a flowchart of an example of a method of camera alignment model calibration in accordance with implementations of this disclosure.

FIG. 9 is a flowchart of an example method of camera alignment model calibration 900 in accordance with implementations of this disclosure. In some implementations, camera alignment model calibration 900 may include adaptively detecting image capture device misalignment and generating or modifying a camera alignment model to maintain or restore the alignment of defined elements in overlapping images, such that overlapping image regions may be combined to form a visually cohesive combined image.

In some implementations, camera alignment model calibration 900 may be performed periodically, in response to an event, or both. For example, camera alignment model calibration 900 may be performed periodically, at a camera alignment calibration rate, such as once per unit time, such as once per second, which may be less than half the frame rate of the input video. In some implementations, the camera alignment calibration rate may be one one-hundredth of the frame rate. In another example, camera alignment model calibration 900 may be performed in response to an event, such as capturing a defined number of frames, such as thirty frames or sixty frames, which may correspond to a frame-rate for captured video, in response to an expiration of a timer, in response to starting, such a powering on, or resetting, an image capture apparatus, in response to input, such as user input, indicating camera alignment model calibration, in response to detecting kinetic force exceeding a defined threshold, in response to detecting a misalignment of overlapping image regions, or any other event, or combination of events, capable of triggering camera alignment model calibration 900.

In some implementations, camera alignment model calibration 900 may be implemented in an image capture apparatus, such as the image capture apparatus 110 shown in FIG. 1, the image capture apparatus 300 shown in FIG. 3, or the image capture apparatus 610 shown in FIG. 6. In some implementations, camera alignment model calibration 900 may be similar to aligning overlapping image regions 700 as shown in FIG. 7, except as described herein. For example, a calibration controller, such as the configuration controller 595 shown in FIG. 5, may implement camera alignment model calibration 900. In another example, aligning overlapping image regions as shown at 700 in FIG. 7 may include identifying one alignment path per longitude evaluated, which may be referred to herein as including a one-dimensional (1D) search, and camera alignment model calibration 900 as shown in FIG. 9 may include identifying a set of candidate alignment paths per longitude evaluated, which may be referred to herein as including a two-dimensional search.

In some implementations, camera alignment model calibration 900 may include identifying a camera alignment model at 910, identifying image portions corresponding to defined relative space at 920, identifying an alignment path at 930, determining correspondence metrics at 940, identifying an alignment at 950, storing a recalibrated camera alignment model at 960, or a combination thereof. In some implementations, camera alignment model calibration 900 may be performed in independently of, or in conjunction with, generating a combined image, such as generating a combined image based on two or more images captured by image capture devices having overlapping fields-of-view. For example, a combined image may be generated based on two or more images captured by image capture devices having overlapping fields-of-view, and, independently, camera alignment model calibration 900 may be performed based on the two or more images.

In some implementations, a camera alignment model, such as a calibrated camera alignment model may be identified at 910. In some implementations, identifying the camera alignment model at 910 may be similar to identifying a calibrated camera alignment model at 710 as shown in FIG. 7. For example, a multi-face capture apparatus, such as the image capture apparatus 110 shown in FIG. 1, the image capture apparatus 300 shown in FIG. 3, or the image capture apparatus 610 shown in FIG. 6, may include a memory, such as the electronic storage unit 224 shown in FIG. 2, and a camera alignment model may be read from the memory, or otherwise received by the image capture apparatus. In some implementations, a calibrated camera alignment model may be a previously calibrated camera alignment model identified based on a previous camera alignment model calibration 900. In some implementations, the image capture apparatus, or a component thereof, such as an image signal processor, may receive calibration parameters, such as from another component to the image capture apparatus. In some implementations, one or more calibration parameters, such as white balance, focus, exposure, flicker adjustment, or the like, may be automatically adjusted in accordance with this disclosure.

Although not shown separately in FIG. 9, in some implementations, the calibrated camera alignment model may be a camera alignment model generated in conjunction with fabrication of the image capture apparatus. For example, the image capture apparatus may be fabricated such that the respective axes of individual image capture devices, such as the image capture device 200 shown in FIG. 2, are physically aligned within a defined fabrication alignment tolerance of an expected fabrication alignment, and an expected fabrication alignment model may indicate an expected mechanical alignment, which may include an expected angular, or rotational, alignment; an expected longitudinal, x-axis, or horizontal, displacement; an expected lateral, y-axis, or vertical, displacement; an expected elevation, z-axis, or depth, displacement; or a combination thereof, between respective image sensors having overlapping fields-of-view. In some implementations, the expected angular alignment may include an expected alignment along a longitudinal, horizontal, or x-axis; a lateral, vertical, or y-axis; an elevation, depth, or z-axis; or a combination thereof. For example, in a multi-face image capture apparatus, such as the image capture apparatus 110 shown in FIG. 1, two image capture devices may have overlapping fields-of-view, the expected angular alignment may indicate that the x-axis and the z-axis of a first image capture device are 90° from the corresponding y-axis and the corresponding z-axis of a second image capture device, and the y-axis of the first image capture device may be parallel to the x-axis of the second image capture device. In some implementations, a fabrication misalignment may be identified, which may indicate a determined difference in camera alignment between the physical alignment of image capture devices as fabricated and the expected alignment, such as a difference within the defined fabrication alignment tolerance. In some implementations, identifying the fabrication misalignment may include capturing overlapping images of reference content; identifying a spatial location in the overlapping regions of the respective images that captured the reference content, which may be related to a distance between the content captured and the respective image capture devices; and determining a difference between an expected spatial location of the reference content in respective captured images and the identified spatial location of the reference content.

Although not shown separately in FIG. 9, in some implementations, camera alignment model calibration 900 may include storing frames captured by a multi-camera array, such as a six-camera cubic array, in a multi-dimensional array, such as a two-dimensional 2×3 array. Storing the frames may be performed prior to camera alignment model calibration 900, prior to generating a combined frame, or both. In some implementations, the six-camera cubic array may include a top image capture device, a right image capture device, a bottom image capture device, a front image capture device, a left image capture device, and a rear image capture device. The 2×3 array may include top storage portions (0,0; 0,1; 0,2) and bottom storage portions (1,0; 1,1; 1,2). Frames captured by the top image capture device, the right image capture device, and the bottom image capture device may be stored in the top storage portions (0,0; 0,1; 0,2), and frames captured by the front image capture device, the left image capture device, and the rear image capture device may be stored in the bottom storage portions (1,0; 1,1; 1,2).

In some implementations, subsequent to identifying the camera alignment model at 910, the physical alignment of one or more image capture devices of an image capture apparatus may change. For example, physical components, such as structural components or materials, of one or more image capture devices, the image capture apparatus, or both may expand, contract, warp, or a combination thereof, in response to changes, such as variations in temperature, aging, physical force, or a combination thereof, which may cause image capture device misalignment. For example, a one-micron change in image capture device alignment may cause a single pixel discrepancy between the image capture devices.

In some implementations, one or more image portions corresponding to defined relative space may be identified at 920. Identifying image portions at 920 may be similar to identifying image portions at 720 as shown in FIG. 7, except as described herein. For example, a first image portion, which may be a point, such as a first pixel, at the relative prime meridian (0° relative longitude) and the relative equator (0° relative latitude) in a first image, and a second image portion, such as a second pixel, at the relative prime meridian (0° relative longitude) and the relative equator (0° relative latitude) in a second image may be identified. The relative equator may correspond with the vertical center of the overlap area, which may be N° from the edge of the respective fields-of-view, which may correlate with M pixels from the edge of the respective images.

In some implementations, an alignment path may be identified at 930. Identifying an alignment path at 930 may be similar to identifying an alignment path at 730 as shown in FIG. 7, except as described herein. The alignment path, or epipolar, may indicate a path, which may be vertical, or approximately vertical, from the point identified at 920 to a point along the edge of the image, such as a point at a distal relative latitude. In some implementations, the alignment path, or epipolar, may be a path along the longitude of the point identified at 920. For example, the two image capture devices may be aligned in a back-to-back configuration, with optical centers aligned along an axis, and the epipolar may be a path along a longitude. In some implementations, the alignment path, or epipolar, may be described by the calibrated camera alignment model. For example, the image capture devices may be aligned in an offset configuration, such as the configuration shown in FIG. 6, and the alignment path may be a function, which may be similar to a sinusoidal waveform, of the camera alignment relative to longitude and latitude. In some implementations, an alignment path for one frame may correspond to a respective alignment path for the other frame.

In some implementations, one or more correspondence metrics may be determined at 940. Identifying correspondence metrics at 940 may be similar to identifying correspondence metrics at 740 as shown in FIG. 7, except as described herein. In some implementations, a group, or block, such as a 13×13 block of pixels, centered on the first pixel identified at 920 may be identified from the first image, and a group, or block, such as a 13×13 block of pixels, centered on the second pixel identified at 920 may be identified from the second image. A difference, or match quality metric, may be determined as a difference between the first block from the first frame and the second block from the second frame. For example, the match quality metric may be determined as a sum of squared differences (SSD), a weighted sum of squared differences, or other difference metric, between the two blocks. In some implementations, determining the correspondence metrics may include determining a match quality metric for respective points along the alignment paths, which may be performed iteratively or in parallel.

In some implementations, identifying image portions corresponding to defined relative space at 920, identifying an alignment path at 930, determining correspondence metrics at 940, or both may be performed for a set of candidate alignment paths for a longitude as indicated by the broken line at 942. A first candidate alignment path from the set of candidate alignment paths may be orthogonal to the equator, which may be aligned along the respective longitude, and each other candidate alignment path from the set of candidate alignment paths may be angularly offset relative to the longitude. The degree of angular offset for a respective candidate alignment path may be a defined angular difference from the degree of angular offset for each other candidate alignment path from the set of candidate alignment path for a longitude. For example, a candidate image portion along a candidate alignment path may be a 13×13 block of pixels, and the degree of angular offset for each other candidate alignment path from the set of candidate alignment path for a longitude may correspond with a spatial difference of six pixels.

For example, a first candidate image portion corresponding to a point, or pixel, along the identified longitude may be identified as indicated at 920, a first candidate alignment path may be identified originating at the first candidate image portion as indicated at 930, and first correspondence metrics may be determined for the first candidate alignment path as indicated at 940; a second candidate image portion corresponding to a point, or pixel, longitudinally, or horizontally, adjacent to the identified longitude, such as a point along the latitude of the first candidate image portion and within a defined spatial distance, such as one pixel, from the identified longitude, in a first direction, such as left or right may be identified, a second candidate alignment path may be identified originating at the second candidate image portion as indicated at 930, and second correspondence metrics may be determined for the second candidate alignment path as indicated at 940; and a third candidate image portion corresponding to a point, or pixel, longitudinally, or horizontally, adjacent to the identified longitude, such as a point along the latitude of the first candidate image portion and within a defined spatial distance, such as one pixel, from the identified longitude, in a second direction, opposite the direction of the second candidate image portion, such as right or left of the first identified image portion may be identified, a third candidate alignment path may be identified originating at the third candidate image portion as indicated at 930, and third correspondence metrics may be determined for the third candidate alignment path as indicated at 940. Although three candidate alignment paths are described herein, any number of candidate alignment paths may be used.

In another example, an alignment path may extend from a location, such as a pixel, in a frame corresponding to a relative longitude and an equator, which may be a midpoint between the field-of-view of the image capture device and the overlapping field-of-view of the adjacent image capture device. The path may extend to a location, such as a pixel, in the frame at an edge of the frame. At a latitude along the path, a longitude of the path may differ from the relative longitude by an amount corresponding to an expected relative orientation of the image capture device and the adjacent image capture device, which may be indicated by the camera alignment model. The alignment path may be identified as a first candidate alignment path, and a second alignment path may be identified corresponding to the first alignment path and longitudinally offset from the first alignment path.

In some implementations, identifying image portions corresponding to defined relative space at 920, identifying an alignment path at 930, determining correspondence metrics at 940, or a combination thereof may be performed for two or more longitudes as indicated by the broken line at 944. For example, identifying image portions corresponding to defined relative space at 920, identifying an alignment path at 930, and determining correspondence metrics at 940 may be performed for respective defined longitudinal distances, such as each 0.5° of longitude, or a defined pixel distance corresponding to a defined longitudinal distance as a function of a resolution of the captured images.

In some implementations, an alignment for the current images may be identified at 950. Identifying the alignment for the current images at 950 may be similar to identifying the alignment for the current images at 750 as shown in FIG. 7, except as described herein. In some implementations, identifying the alignment for the current images at 950 may include simultaneously optimizing the correspondence metrics, which may include the correspondence metrics for respective candidate alignment paths, and a smoothness criterion. A disparity profile from the correspondence metrics may include a discrete per longitude sequence of match quality metrics, wherein a respective match quality metric for a longitude may correspond to one of the candidate alignment paths for the longitude. Simultaneously optimizing may include identifying a disparity profile representing a latitude per longitude evaluated, having a minimal cost, which may be a sum of match quality metrics, subject to the smoothness criterion.

For example, 724 longitudes may be evaluated in a respective frame, which may include determining correspondence metrics for 724 alignment paths, which may be approximately one alignment path per 0.5° longitude for 360°; 150 match quality metrics may be determined for a respective alignment path, which may include three candidate alignment paths per longitude, which may correspond to 450 (3*150) latitudes evaluated per longitude evaluated, which may be approximately three match quality metrics per 0.1° latitude for 10°, and determining the correspondence metrics may include determining 325800 (724*3*150) match quality metrics.

In some implementations, a calibrated, or recalibrated, camera alignment model may be generated and stored at 960. Generating the calibrated camera alignment model may include calibrating the camera alignment model identified at 910 based on the disparity profile identified at 950. For example, for a longitude the camera alignment model identified at 910 may indicate an alignment path, the disparity profile identified at 950 may indicate a candidate alignment path that differs from the alignment path for the longitude indicated by the camera alignment model identified at 910, and the calibrated camera alignment model may update the alignment path for the longitude based on the candidate alignment path identified at 950. For example, updating the alignment path may include omitting the alignment path indicated in the camera alignment model identified at 910 from the calibrated camera alignment model and including the candidate alignment path identified at 950 in the calibrated camera alignment model as the alignment path for the longitude. In another example, updating the alignment path may include using a weighted average of the alignment path indicated in the camera alignment model identified at 910 and the candidate alignment path identified at 950 as the alignment path for the longitude.

In some implementations, the relative weight of the candidate alignment path for updating the alignment path may be lowered, or updating based on the candidate alignment path may be omitted. For example, a difference between the alignment path for the longitude indicated by the camera alignment model identified at 910 and the candidate alignment path identified at 950 may exceed a threshold, which may indicate that the difference is inconsistent with one or more defined alignment change profiles, and updating based on the candidate alignment path may be omitted. An alignment change profile may indicate a defined range of change in alignment corresponding to a cause, such as a temperature change, of the change in alignment.

Although not shown separately in FIG. 9, in some implementations, determining the correspondence metrics at 940 may include determining a gradient of the match quality metric as a function of the angle of the path relative to the longitude, and calibrating the camera alignment model at 960 may be based on the gradient, and the periodic 2D search may be omitted. For example, a gradient of the match quality metric as a function of the angle of the path relative to the longitude may be a difference between the match metrics on adjacent pixels, such as two adjacent pixels, in a direction parallel to the equator, which may indicate a direction, magnitude, or both of angular offset to apply to a corresponding alignment path.

Compressing, or encoding, an image, or video, may include allocating encoding resources, such as bit allocations, for encoding the images, or portions thereof. Allocating encoding resources may include identifying encoding parameters, such as quantization parameters, and rate control to optimize bit allocation in the encoded stream. These parameters can be determined by hardware and/or software. Single-pass encoding may inefficiently allocate resources for some portions, such as some blocks, of an image or frame. Multi-pass encoding may increase processor utilization, latency, or both.

In some implementations, encoding hints for bitrate control are determined by an image signal processor and passed to an encoder with a corresponding frame or frames of video to be encoded. The image signal processor may process complete frames of video before hand-off to the encoder to facilitate integration of the two components and/or because the image signal processor implements a multi-pass algorithm, such as for local motion compensation and temporal noise reduction, to process a frame of video data. Because the image signal processor processes complete frames of video before the encoder, the image signal processor is able to determine encoding hints based on a complete frame of data which may then be made available to the encoder when the encoder starts encoding the frame. This allows the encoder to utilize frame-wide information while only performing a single-pass to encode the frame. Thus the encoder may utilize these encoding hints to improve resource allocation relative to single-pass encoding that omits the encoding hints, and may reduce processor utilization, latency, or both, relative to multi-pass encoding. Image signal processing based encoding hints for bitrate control may include the image signal processor generating encoding hints, such as scene complexity indication values, and storing the encoding hints in a shared memory. The encoder may read the encoding hints from the shared memory and may utilize the encoding hits to efficiently encode the images or video in a single-pass.

A spherical camera may include two back-to-back hyper hemispherical-sensors as shown in FIGS. 1, 3, and 6. In order to maximize the captured dynamic range of each image from the respective devices, each of the two back-to-back hyper-hemispherical sensors is configured to independently run auto-exposure (AE). Since the AE of each hyper-hemispherical sensor may differ, even slight differences of exposure time may produce an artifact such as a line with an abrupt luminance change at the stitch point (or line) of the images.

Figure 10:
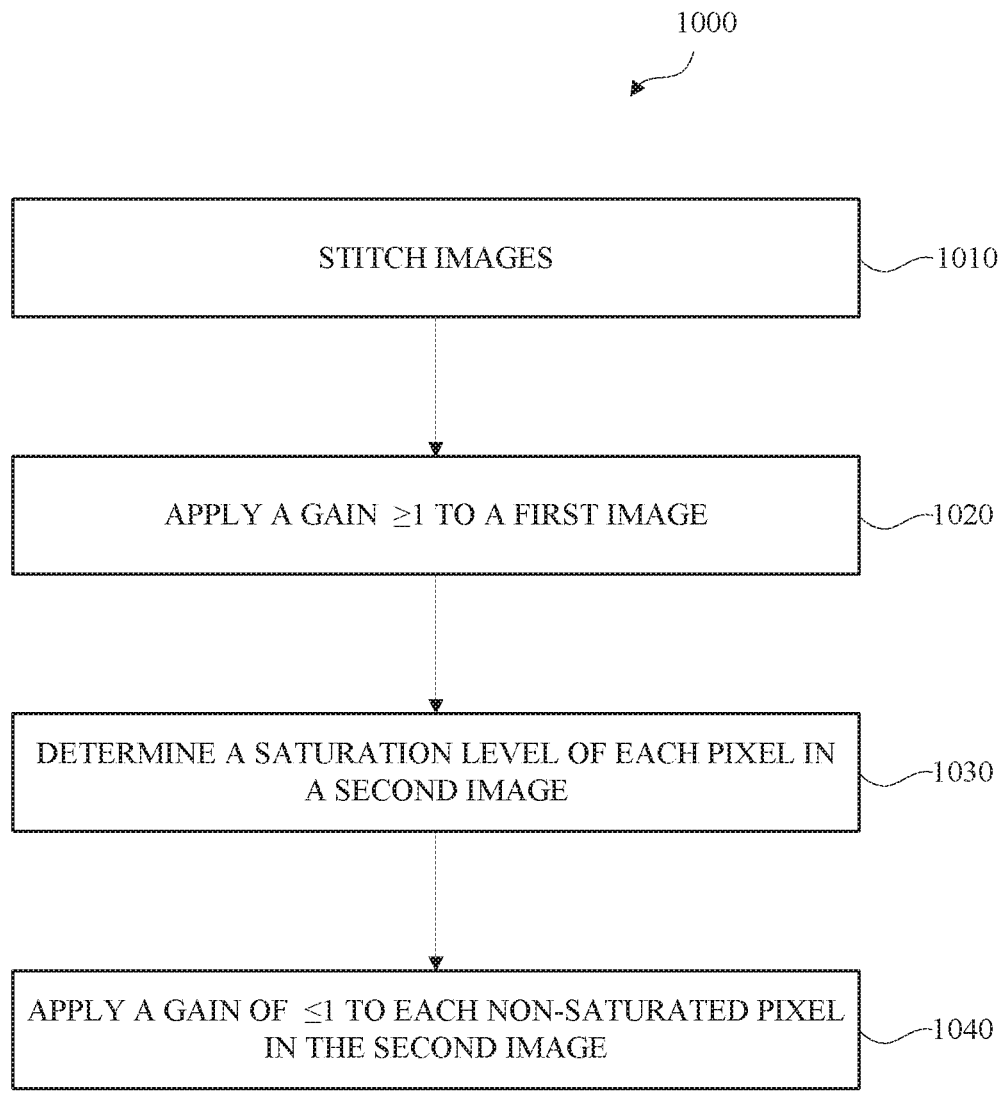
FIG. 10 is a flow chart of an example method to compensate for differences in exposure time in images.

FIG. 10 is a flow chart of an example method 1000 to compensate for the differences in exposure time and gain of the images. A gain factor or value may be applied to the images to compensate for the differences in exposure time. For example, a gain value of greater than or equal to 1 may be applied to a dark image (i.e., an image with a low exposure) to brighten the image. Conversely, a gain value of less than or equal to 1 may be applied to a lighter image (i.e., an image with a high exposure) to darken the image. When a gain value of less than or equal to 1 is applied to an image, pixel values may become desaturated and produce an undesirable image. Referring to FIG. 10, two images are stitched together at 1010. In this example, two images are used for simplicity and it is understood that more than two images may be stitched together and applied to the same method. In this example, a first image has a lower exposure than a second image. At 1020, a gain value of greater than or equal to 1 is applied to the first image. At 1030, a determination of the saturation level for each pixel in the second image is made.

Saturation is a type of distortion where an image is limited to a maximum value that interferes with the measurement of bright regions of the image. A pixel whose intensity corresponds to the maximum value is referred to as a saturated pixel. A pixel whose intensity corresponds to less than the maximum value is referred to as a non-saturated pixel. Saturated pixels contain less information about the image than non-saturated pixels. Referring again to FIG. 10, for each pixel that is non-saturated in the second image, a gain value of less than or equal to 1 is applied at 1040. The gain value is not applied to the saturated pixels in the second image. Details of how the gain values are applied to each image are discussed in FIG. 11 below.

Figure 11:
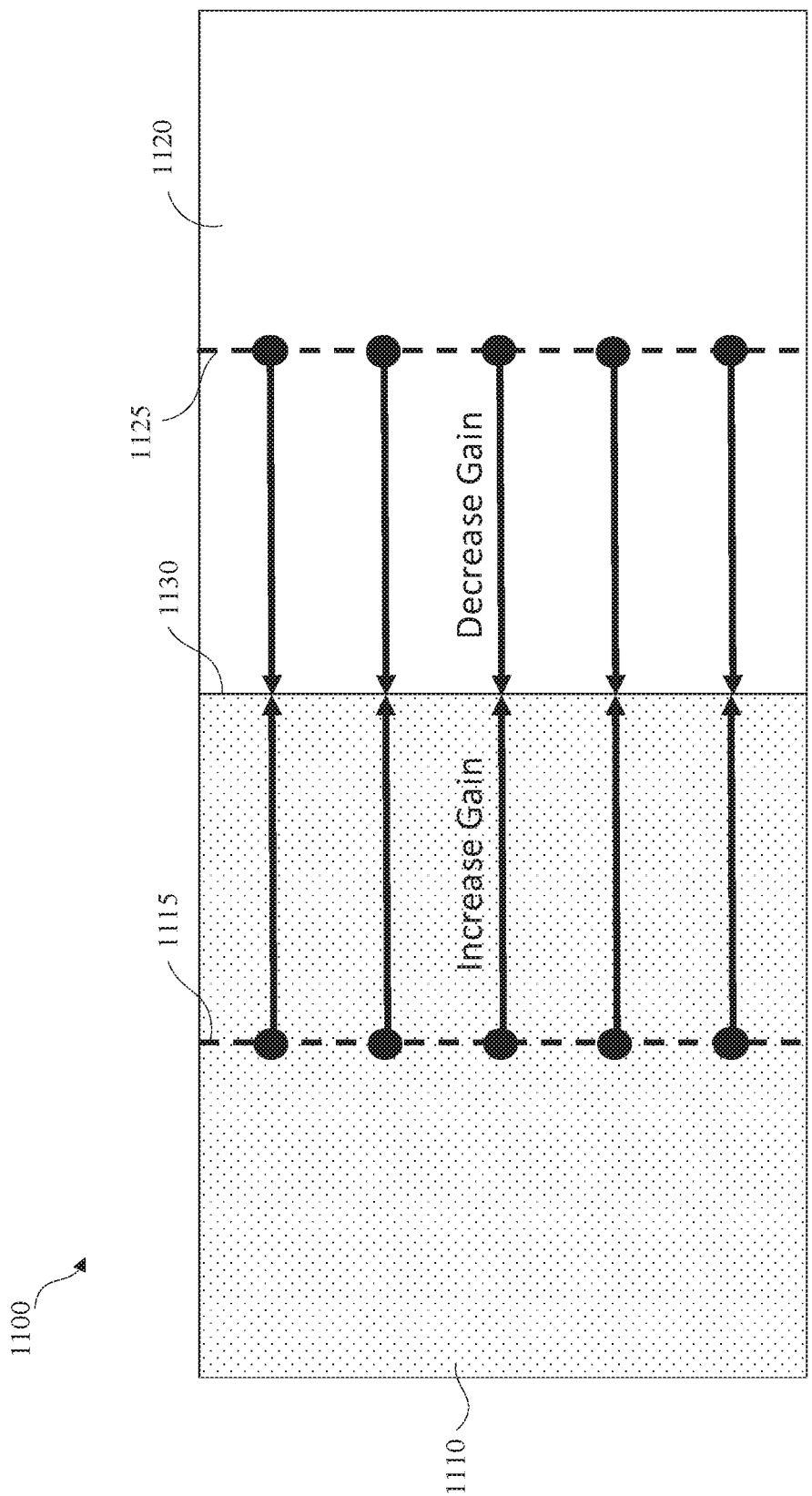
FIG. 11 is a diagram of an example of stitching of images applying the method of FIG. 10.

FIG. 11 is a diagram of an example of stitching of images 1100 applying the method of FIG. 10. Referring to FIG. 11, a first image 1110 has an approximate center 1115 and a second image 1120 has an approximate center 1125. The first image 1110 and the second image 1120 are joined together at a stitch point 1130 where an edge of the first image 1110 and an edge of the second image 1120 meet. The stitch point 1130 may be a line between the edge of the first image 1110 and the edge of the second image 1120. The stitch point 1130 may be an area where pixels from the first image 1110 and pixels from the second image 1120 overlap. The first image 1110 is shown to have a lower exposure level than the second image 1120. In order to compensate for the differences in exposure, a gain value of greater than or equal to 1 is applied to the first image 1110 and a gain value of less than or equal to 1 is applied to the second image 1120 such that a common exposure level is achieved at the stitch point 1130. The common exposure level may be an average or midpoint of the exposure levels of the first image 1110 and the second image 1120.

As shown in FIG. 11, a gain value greater than or equal to 1 is applied from the approximate center 1115 of the first image 1110. This gain value for the first image 1110 is gradually increased from the approximate center 1115 to the edge of the first image 1110 to achieve a smooth transition to a common exposure level at the stitch point 1130. A gain value less than or equal to 1 is applied from the approximate center 1125 of the second image 1120. This gain value for the second image 1120 is gradually decreased from the approximate center 1125 to the edge of the second image 1120 to achieve a smooth transition to a common exposure level at stitch point 1130.

For example, if the first image 1110 is four times less exposed than the second image 1120, the applied gain value for the first image 1110 may smoothly transition from 1 to 2 from the approximate center 1115 to the stitch point 1130. The gain value transition from the approximate center 1115 to the stitch point 1130 may be linear or non-linear. Concurrently, the applied gain value for the second image 1120 may smoothly transition from 1 to 0.5 from the approximate center 1125 to the stitch point 1130. The gain value transition from the approximate center 1125 to the stitch point 1130 may be linear or non-linear.

When applying a gain value of less than or equal to 1, a potential exists to desaturate the pixels resulting in an undesirable image. In order to avoid desaturation of pixels, a scale k' is determined and applied to the gain value of each pixel across each color channel R, G, and B. For example, let scale (k,x) be a function whose value is k*x where x is below a saturation level threshold such that scale (k,maxval) =maxval. The gain value is applied to pixels that are below the saturation level threshold, where the saturation level threshold may be two times the saturation level minus the maximum saturation level. Let M=max(R,G,B) and k'=scale (k,M)/M. The resulting scaled values for each respective color channel are then k'*R, k'*G, k'*B. Accordingly, scale k' varies with latitude and is adjusted for each pixel using the scale function, which is a maximum of k*x where x is the maximum value across color channels of pixel values.

Figure 12:
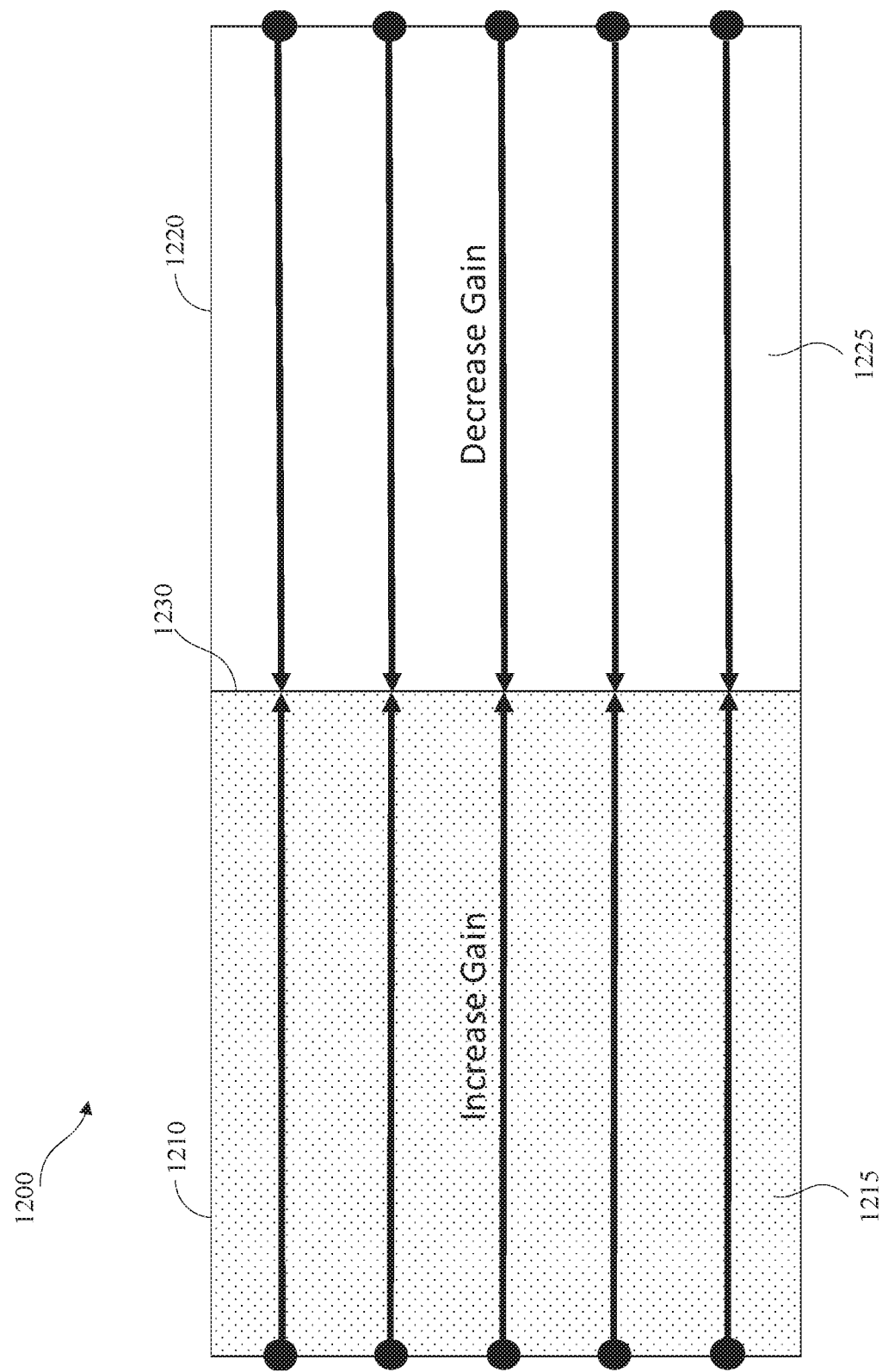
FIG. 12 is a diagram of another example of stitching of images applying the method of FIG. 10.

FIG. 12 is a diagram of another example 1200 of stitching of images applying the method of FIG. 10. Referring to FIG. 12, a first image 1210 has an outer edge 1215 and a second image 1220 has an outer edge 1225. The first image 1210 and the second image 1220 are joined together at a stitch point 1230 where an inner edge of the first image 1210 and an inner edge of the second image 1220 meet. The stitch point 1230 may be a line between the inner edge of the first image 1210 and the inner edge of the second image 1220. The stitch point 1230 may be an area where pixels from the first image 1210 and pixels from the second image 1220 overlap. The first image 1210 is shown to have a lower exposure level than the second image 1220 using, for example, stippling. In order to compensate for the differences in exposure, a gain value of greater than or equal to 1 is applied to the first image 1210 and a gain value of less than or equal to 1 is applied to the second image 1220 such that a common exposure level is achieved at the stitch point 1230. The common exposure level may be an average or midpoint of the exposure levels of the first image 1210 and the second image 1220.

As shown in FIG. 12, a gain value greater than or equal to 1 is applied from the outer edge 1215 of the first image 1210. This gain value for the first image 1210 is gradually increased from the outer edge 1215 to the inner edge of the first image 1210 to achieve a smooth transition to a common exposure level at the stitch point 1230. Alternatively, a constant gain value may be applied to the first image 1210 to obtain the common exposure level. The constant gain value may be referred to as a global gain value. In yet another alternative, a mix between a constant gain and a field-variable gain may be applied to the first image 1210. For example, a global gain value may first be applied to the first image 1210, and a remaining difference between the new exposure level and the common exposure level may be compensated for by gradually adjusting the gain from the center of the first image 1210 to the inner edge of the first image 1210 or from the outer edge 1215 of the first image 1210 to the inner edge of the first image 1210.

A gain value less than or equal to 1 is applied from the outer edge 1225 of the second image 1220. This gain value for the second image 1220 is gradually decreased from the outer edge 1225 to the inner edge of the second image 1220 to achieve a smooth transition to the common exposure level at stitch point 1230. Alternatively, a constant gain value may be applied to the second image 1220 to obtain the common exposure level. In some embodiments, the gain value of the first image 1210 may be gradually adjusted from the outer edge 1215 or the approximate center 1115 shown in FIG. 11 to reach the common exposure level at the stitch point 1230, while a constant gain value is applied globally to the second image 1220 to reach the common exposure level, or vice-versa.

In an example where the first image 1210 is four times less exposed than the second image 1220, the applied gain value for the first image 1210 may smoothly transition from 1 to 2 from the outer edge 1215 to the stitch point 1230. The gain value transition from the outer edge 1215 to the stitch point 1230 may be linear or non-linear. Concurrently, the applied gain value for the second image 1220 may smoothly transition from 1 to 0.5 from the outer edge 1225 to the stitch point 1230. The gain value transition from the outer edge 1225 to the stitch point 1230 may be linear or non-linear.

When applying a gain value of less than or equal to 1, a potential exists to desaturate the pixels resulting in an undesirable image. In order to avoid desaturation of pixels, a scale k' is determined and applied to the gain value of each pixel across each color channel R, G, and B. For example, let scale (k,x) be a function whose value is k*x where x is below a saturation level threshold such that scale (k,maxval) =maxval. The gain value is applied to pixels that are below the saturation level threshold, where the saturation level threshold may be two times the saturation level minus the maximum saturation level. Let M=max(R,G,B) and k'=scale (k,M)/M. The resulting scaled values for each respective color channel are then k'*R, k'*G, k'*B. Accordingly, scale k' varies with latitude and is adjusted for each pixel using the scale function, which is a maximum of k*x where x is the maximum value across color channels of pixel values.

Figure 13:
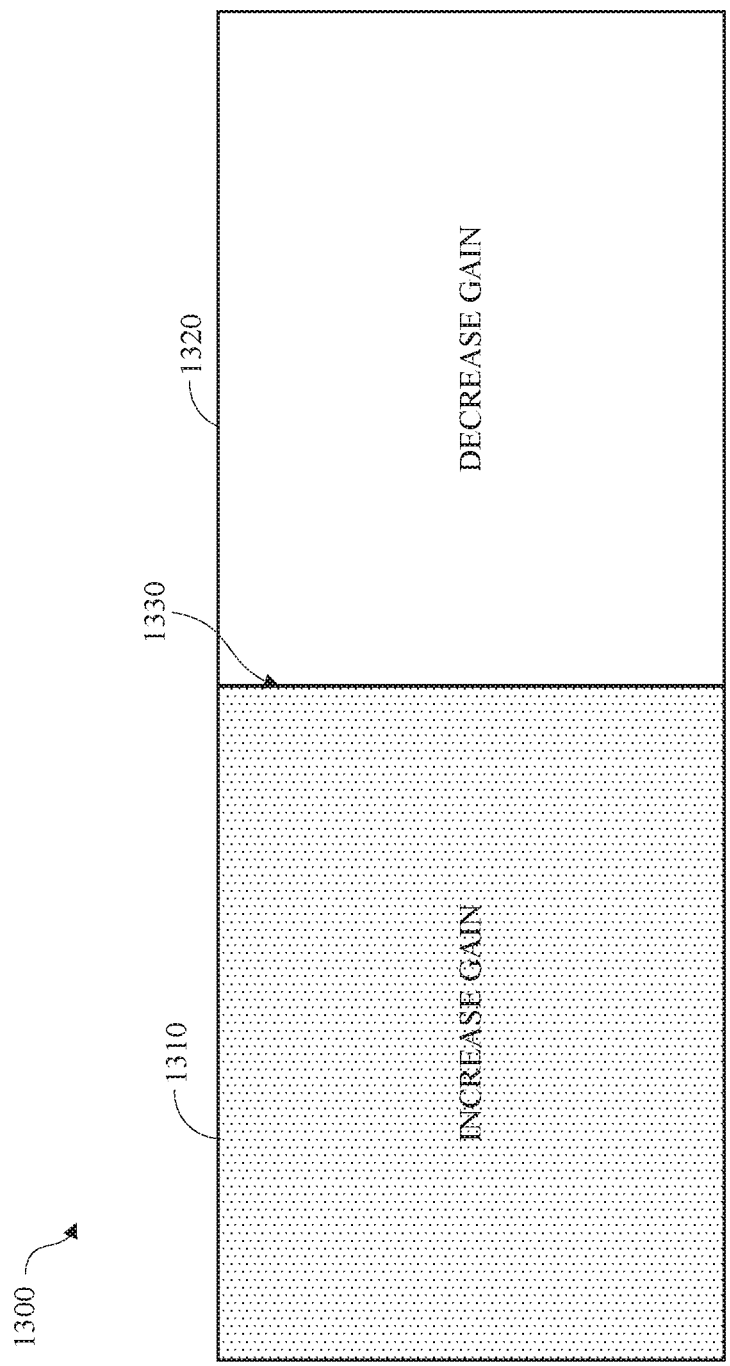
FIG. 13 is a diagram of another example of stitching of images applying the method of FIG. 10 using a constant or global gain value for each image.

FIG. 13 is a diagram of another example 1300 of stitching of images applying the method of FIG. 10 using a constant or global gain value for each image. In this example, a first image 1310 is four times less exposed than a second image 1320, and a constant or global gain value of 2 may be applied to the first image 1310. Concurrently, a constant or global gain value of 0.5 may be applied to the second image 1320. As noted above, the gain value of the first image 1310 may be gradually adjusted from the outer edge 1215 or the approximate center 1115 shown in FIG. 11 to reach the common exposure level at a stitch point 1330, while a constant gain value is applied globally to the second image 1320 to reach the common exposure level, or vice-versa.

When applying a gain value of less than or equal to 1, a potential exists to desaturate the pixels resulting in an undesirable image. In order to avoid desaturation of pixels, a scale k' is determined and applied to the gain value of each pixel across each color channel R, G, and B. For example, let scale (k,x) be a function whose value is k*x where x is below a saturation level threshold such that scale (k,maxval) =maxval. The gain value is applied to pixels that are below the saturation level threshold, where the saturation level threshold may be two times the saturation level minus the maximum saturation level. Let M=max(R,G,B) and k'=scale (k,M)/M. The resulting scaled values for each respective color channel are then k'*R, k'*G, k'*B. Accordingly, scale k' varies with latitude and is adjusted for each pixel using the scale function, which is a maximum of k*x where x is the maximum value across color channels of pixel values.

Figure 14:
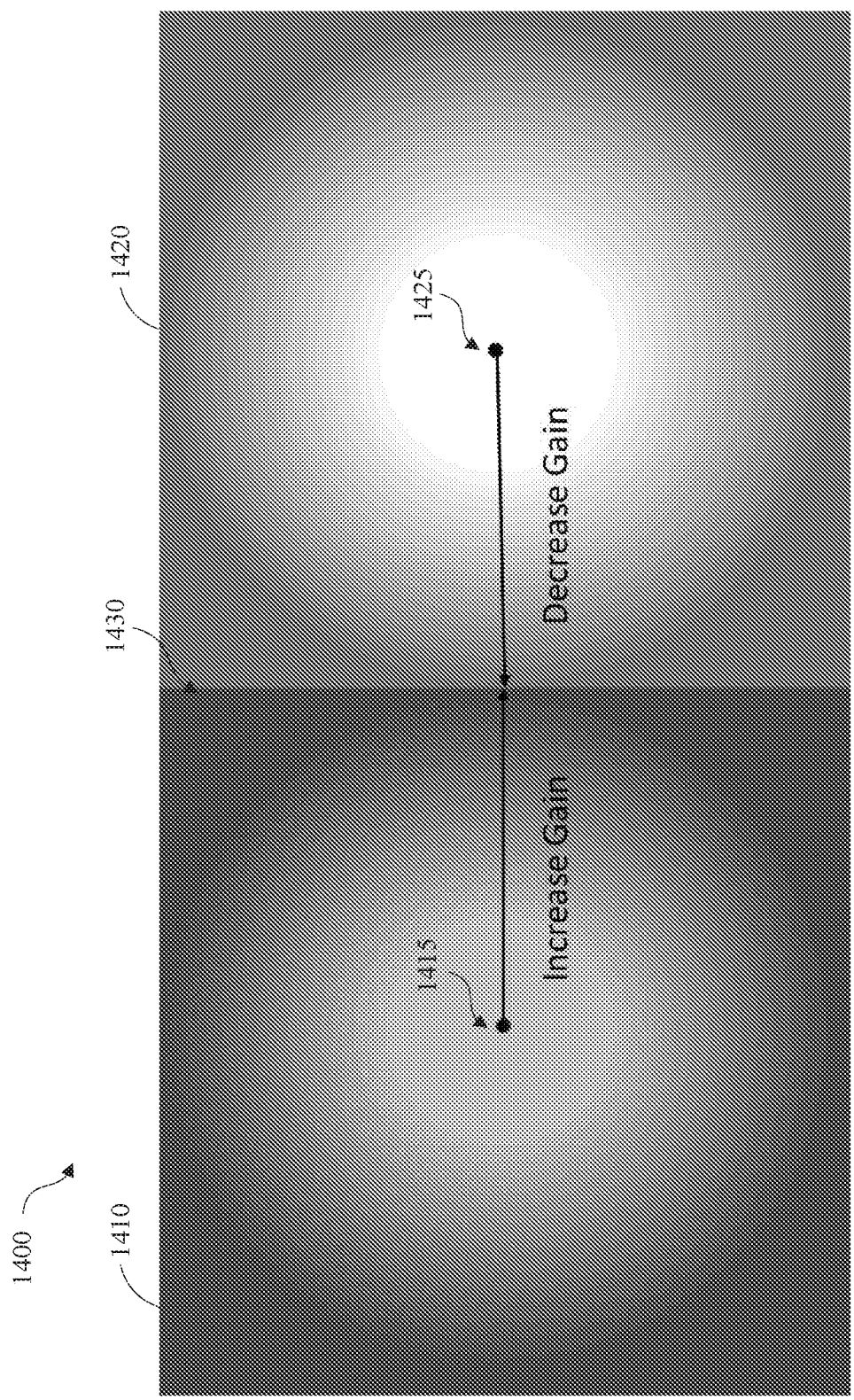
FIG. 14 is a diagram of an example of stitching of fisheye images applying the method of FIG. 10.

FIG. 14 is a diagram of an example 1400 of stitching of fisheye images applying the method of FIG. 10. Referring to FIG. 14, a first image circle 1410 has a center 1415 and a second image circle 1420 has a center 1425. The first image circle 1410 and the second image circle 1420 are joined together at a stitch point 1430 where an outer edge of the first image circle 1410 and an outer edge of the second image circle 1420 meet. The stitch point 1430 may be an area where pixels from the first image circle 1410 and pixels from the second image circle 1420 overlap. The first image circle 1410 is shown to have a lower exposure level than the second image circle 1420 using, for example, stippling. In order to compensate for the differences in exposure, a gain value of greater than or equal to 1 is applied to the first image circle 1410 and a gain value of less than or equal to 1 is applied to the second image circle 1420 such that a common exposure level is achieved at the stitch point 1430. The common exposure level may be an average or midpoint of the exposure levels of the first image circle 1410 and the second image circle 1420.

As shown in FIG. 14, a gain value greater than or equal to 1 is applied from the center 1415 of the first image circle 1410. This gain value for the first image circle 1410 is gradually increased from the center 1415 to the stitch point 1430 to achieve a smooth transition to a common exposure level at the stitch point 1430. Alternatively, a constant gain value may be applied to the first image circle 1410 to obtain the common exposure level. The constant gain value may be referred to as a global gain value. In yet another alternative, a mix between a constant gain and a field-variable gain may be applied to the first image circle 1410. For example, a global gain value may first be applied to the first image circle 1410, and a remaining difference between the new exposure level and the common exposure level may be compensated for by gradually adjusting the gain from the center 1415 of the first image circle 1410 to the stitch point 1430.

A gain value less than or equal to 1 is applied from the center 1425 of the second image circle 1420. This gain value for the second image circle 1420 is gradually decreased from the center 1425 to the stitch point 1430 to achieve a smooth transition to the common exposure level at stitch point 1430. Alternatively, a constant gain value may be applied to the second image circle 1420 to obtain the common exposure level. In some embodiments, the gain value of the first image circle 1410 may be gradually adjusted from the center 1415 to reach the common exposure level at the stitch point 1430, while a constant gain value is applied globally to the second image circle 1420 to reach the common exposure level, or vice-versa.

In an example where the first image circle 1410 is four times less exposed than the second image circle 1420, the applied gain value for the first image circle 1410 may smoothly transition from 1 to 2 from the center 1415 to the stitch point 1430. The gain value transition from the center 1415 to the stitch point 1430 may be linear or non-linear. Concurrently, the applied gain value for the second image circle 1420 may smoothly transition from 1 to 0.5 from the center 1425 to the stitch point 1430. The gain value transition from the center 1425 to the stitch point 1430 may be linear or non-linear.

When applying a gain value of less than or equal to 1, a potential exists to desaturate the pixels resulting in an undesirable image. In order to avoid desaturation of pixels, a scale k' is determined and applied to the gain value of each pixel across each color channel R, G, and B. For example, let scale (k,x) be a function whose value is k*x where x is below a saturation level threshold such that scale (k,maxval) =maxval. The gain value is applied to pixels that are below the saturation level threshold, where the saturation level threshold may be two times the saturation level minus the maximum saturation level. Let M=max(R,G,B) and k'=scale (k,M)/M. The resulting scaled values for each respective color channel are then k'*R, k'*G, k'*B. Accordingly, scale k' varies with latitude and is adjusted for each pixel using the scale function, which is a maximum of k*x where x is the maximum value across color channels of pixel values.

An example apparatus may include an image signal processor. The image signal processor may be configured to obtain a first image signal associated with a first image comprising first pixels. The first image signal may be obtained from a first image sensor. The image signal processor may be configured to obtain a second image signal associated with a second image comprising second pixels. The second image signal may be obtained from a second image sensor. The image signal processor may be configured to join an edge of the first image to an edge of the second image to form a stitch point between the edge of the first image and the edge of the second image.

In some implementations, the image signal processor of the example apparatus may be configured to determine an exposure level for each of the first image and the second image. In an example, the exposure level of the first image may be lower than the exposure level of the second image. The image signal processor may be configured to apply a gain value of greater than or equal to one (1) to the exposure level of the first image. The image signal processor may be configured to apply a gain value of less than or equal to one (1) to the exposure level of the second image. The image signal processor may be configured to obtain an exposure compensated image. The exposure compensated image may be based on the gain value applied to the exposure level of the first image and the gain value applied to the exposure level of the second image.

In some implementations, the image signal processor may be configured to determine a saturation level of each of the second pixels. On a condition that the saturation level of a pixel of the second pixels is below a threshold, the image signal processor may apply a gain value of less than or equal to one (1) to the pixel. In an example, the threshold may be a saturation level threshold, and may be two times the saturation level minus a maximum saturation level.

In some implementations, the image signal processor may be configured to scale a gain value of each pixel of the second pixels that is below the threshold. The gain value may be scaled for each of color channel red (R), color channel green (G), and color channel blue (B).

In some implementations, the image signal processor may be configured to determine a common exposure level. For example, the image signal processor may progressively decrease the gain value of less than or equal to one (1) from an approximate center of the second image to the edge of the second image to the common exposure level at the stitch point. The common exposure level may be an exposure level between the exposure level of the first image and the exposure level of the second image. The image signal processor may obtain the common exposure level by applying a global gain of less than or equal to one (1) to the second image. The image signal processor may obtain the common exposure level by applying a spatially variable gain of less than or equal to one (1) to the second image. The image signal processor may obtain the common exposure level by applying a global gain of less than or equal to one (1) and a spatially variable gain of less than or equal to one (1) to the second image.

In some implementations, the image signal processor may be configured to determine a common exposure level and progressively increase the gain value of greater than or equal to one (1) from an approximate center of the first image to the edge of the first image to the common exposure level at the stitch point. In an example, the common exposure level may be determined by averaging the exposure level of the first image and the exposure level of the second image. The common exposure level may be obtained by applying a global gain of greater than or equal to one (1) to the first image. The common exposure level may be obtained by applying a spatially variable gain of greater than or equal to one (1) to the first image. The common exposure level may be obtained by applying a global gain of greater than or equal to one (1) and a spatially variable gain of greater than or equal to one (1) to the first image.

An example method may include stitching an edge of a first image to an edge of a second image. The exposure level of the first image may be less than an exposure level of the second image. The method may include applying a gain value greater than one (1) to the first image. The method may include determining a saturation level of each pixel in the second image. Each pixel in the second image may be determined as a saturated pixel or a non-saturated pixel. The method may include applying a gain value less than one (1) to each non-saturated pixel in the second image. The method may include obtaining an exposure compensated image. The exposure compensated image may be based on the gain value applied to the exposure level of the first image and the gain value applied to the exposure level of each non-saturated pixel of the second image.

In some implementations, the gain value of less than one (1) may be applied to each color channel. In some implementations, a constant gain value may be applied to the first image. In some implementations, the gain value may be gradually increased towards the edge of the first image.

An example method may include stitching an edge of a first image circle to an edge of a second image circle. In this example, the exposure level of the first image circle may be less than an exposure level of the second image circle. The method may include applying a gain value greater than one (1) to the first image circle. The gain value of the first image circle may be gradually increased from a center point of the first image circle to the edge of the second image circle. The method may include applying a gain value less than one (1) to the second image circle. The gain value of the second image circle may be gradually decreased from a center point of the second image circle to the edge of the first image circle. The method may include obtaining an exposure compensated image. The exposure compensated image may be based on the gain value applied to the first image circle and the gain value applied to the second image circle.

In some implementations, the method may include determining a saturation level of a pixel of the second image circle. On a condition that the saturation level of the pixel is below a threshold, the method may include applying a gain value of less than or equal to one (1) to the pixel.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of human or machine cognizable steps which perform a function. Such program may be rendered in virtually any programming language or environment including, for example, C/C++, C#, Fortran, COBOL, MATLAB™, PASCAL, Python, assembly language, markup languages, such as HTML, Standard Generalized Markup Language (SGML), XML, Voice Markup Language (VoxML), as well as object-oriented environments such as the Common Object Request Broker Architecture (CORBA), Java™ (including J2ME, Java Beans), and/or Binary Runtime Environment, such as Binary Runtime Environment for Wireless (BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory, such as NAND/NOR, memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays, such as field programmable gate arrays, PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire, such as FW400, FW110, and/or other variations, USB, such as USB2, Ethernet, such as 10/100, 10/100/1000 (Gigabit Ethernet, 10-Gig-E, and/or other Ethernet implementations), MoCA, Coaxsys, such as TVnet™, radio frequency tuner, such as in-band or out-of-band, cable modem, and/or other radio frequency tuner protocol interfaces, Wi-Fi (802.11), WiMAX (802.16), personal area network (PAN), such as 802.15, cellular, such as 3G, LTE/LTE-A/TD-LTE, GSM, and/or other cellular technology, IrDA families, and/or other network interfaces.

As used herein, the term "Wi-Fi" includes one or more of IEEE-Std. 802.11, variants of IEEE-Std. 802.11, standards related to IEEE-Std. 802.11, such as 802.11 a/b/g/n/s/v, and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(such as, IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum, such as infrared, ultraviolet, and/or other energy, such as pressure waves.

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. An apparatus comprising:
an image signal processor configured to:
obtain, from a first image sensor, a first image signal associated with a first image comprising first pixels;
obtain, from a second image sensor, a second image signal associated with a second image comprising second pixels;
join an edge of the first image to an edge of the second image to form a stitch point between the edge of the first image and the edge of the second image;
determine an exposure level for each of the first image and the second image, wherein the exposure level of the first image is lower than the exposure level of the second image;
apply a gain value of greater than or equal to one (1) to the exposure level of the first image;
determine a saturation level of each of the second pixels;
on a condition that the saturation level of a pixel of the second pixels is below a threshold, apply a gain value of less than or equal to one (1) to the exposure level of the pixel; and
obtain an exposure compensated image based on the gain value applied to the exposure level of the first image and the gain value applied to the exposure level of the pixel.

2. The apparatus of claim 1, wherein the threshold is a saturation level threshold and is two times the saturation level minus a maximum saturation level.

3. The apparatus of claim 1, wherein the image signal processor is further configured to:
scale a gain value of each pixel of the second pixels that is below the threshold, wherein the gain value is scaled for each of color channel red (R), color channel green (G), and color channel blue (B).

4. The apparatus of claim 1, wherein the image signal processor is further configured to:
determine a common exposure level; and progressively decrease the gain value of less than or equal to one (1) from an approximate center of the second image to the edge of the second image to the common exposure level at the stitch point.

5. The apparatus of claim 4, wherein the common exposure level is an exposure level between the exposure level of the first image and the exposure level of the second image.

6. The apparatus of claim 4, wherein the gain value is a global gain value and the common exposure level is obtained by applying the global gain value of less than or equal to one (1) to the second image.

7. The apparatus of claim 4, wherein the gain value is a spatially variable gain value and the common exposure level is obtained by applying the spatially variable gain value of less than or equal to one (1) to the second image.

8. The apparatus of claim 4, wherein the common exposure level is obtained by applying a global gain value associated with the gain value of less than or equal to one (1) and a spatially variable gain value associated with the gain value of less than or equal to one (1) to the second image.

9. The apparatus of claim 1, wherein the image signal processor is further configured to:
determine a common exposure level; and
progressively increase the gain value of greater than or equal to one (1) from an approximate center of the first image to the edge of the first image to the common exposure level at the stitch point.

10. The apparatus of claim 9, wherein the common exposure level is determined by averaging the exposure level of the first image and the exposure level of the second image.

11. The apparatus of claim 9, wherein the gain value is a global gain value and the common exposure level is obtained by applying the global gain value of greater than or equal to one (1) to the first image.

12. The apparatus of claim 9, wherein the gain value is a spatially variable gain value and the common exposure level is obtained by applying the spatially variable gain value of greater than or equal to one (1) to the first image.

13. The apparatus of claim 9, wherein the common exposure level is obtained by applying a global gain value associated with the gain value of greater than or equal to one (1) and a spatially variable gain value associated with the gain value of greater than or equal to one (1) to the first image.

14. A method comprising:
stitching an edge of a first image to an edge of a second image, wherein an exposure level of the first image is less than an exposure level of the second image;
applying a gain value greater than one (1) to the first image;
determining a saturation level of each pixel in the second image, wherein each pixel in the second image is determined as a saturated pixel or a non-saturated pixel;
applying a gain value less than one (1) to each non-saturated pixel in the second image; and
obtaining an exposure compensated image based on the gain value applied to the exposure level of the first image and the gain value applied to the exposure level of each non-saturated pixel of the second image.

15. The method of claim 14, wherein the gain value of less than one (1) is applied to each color channel.

16. The method of claim 14, wherein a constant gain value is applied to the first image.

17. The method of claim 14, wherein the gain value of greater than one (1) is gradually increased towards the edge of the first image.

18. A method comprising:
stitching an edge of a first image circle to an edge of a second image circle, wherein an exposure level of the first image circle is less than an exposure level of the second image circle;
applying a gain value greater than one (1) to the first image circle, wherein the gain value of the first image circle is gradually increased from a center point of the first image circle to the edge of the second image circle;
determining a saturation level of a pixel of the second image circle
on a condition that the saturation level of the pixel is below a threshold, applying a gain value less than one (1) to the pixel of the second image circle, wherein the gain value is gradually decreased from a center point of the second image circle to the edge of the first image circle; and
obtaining an exposure compensated image based on the gain value applied to the first image circle and the gain value applied to the pixel of the second image circle.

19. The method of claim 18, further comprising:
determining a common exposure level; and
progressively increasing the gain value greater than one (1) from an approximate center of the first image circle to the edge of the first image circle to the common exposure level.

20. The method of claim 18, further comprising:
determining a common exposure level; and
progressively decreasing the gain value less than one (1) from an approximate center of the second image circle to the edge of the second image circle to the common exposure level.

* * * * *